Dec. 22, 1959 H. J. GERBER 2,918,213
COMPUTING INSTRUMENT FOR USE IN THE ANALYSIS OF GRAPHS
AND CURVES HAVING INITIALLY UNKNOWN CHARACTERISTICS
Filed Sept. 25, 1956 8 Sheets-Sheet 3

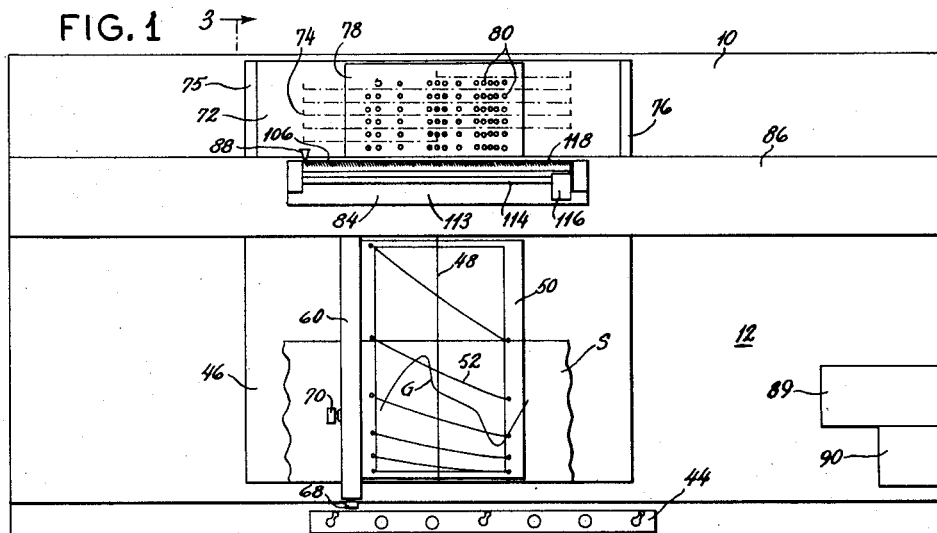
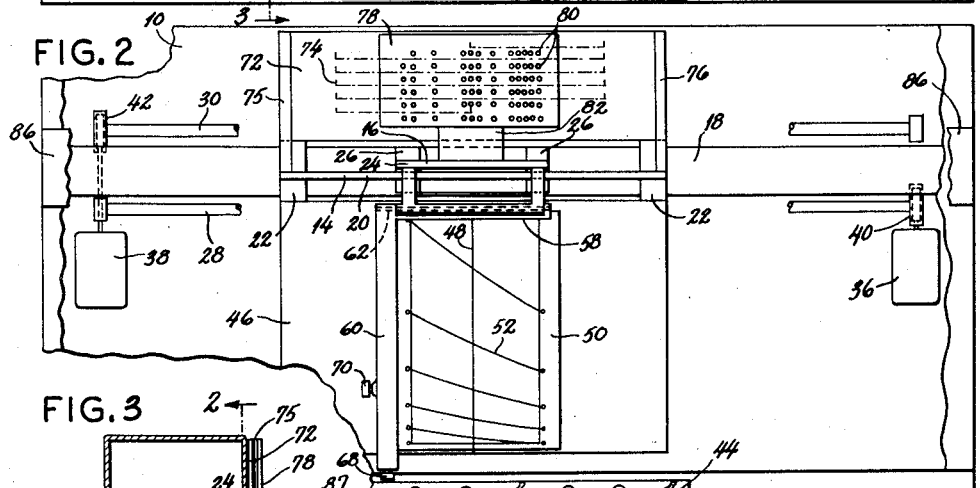
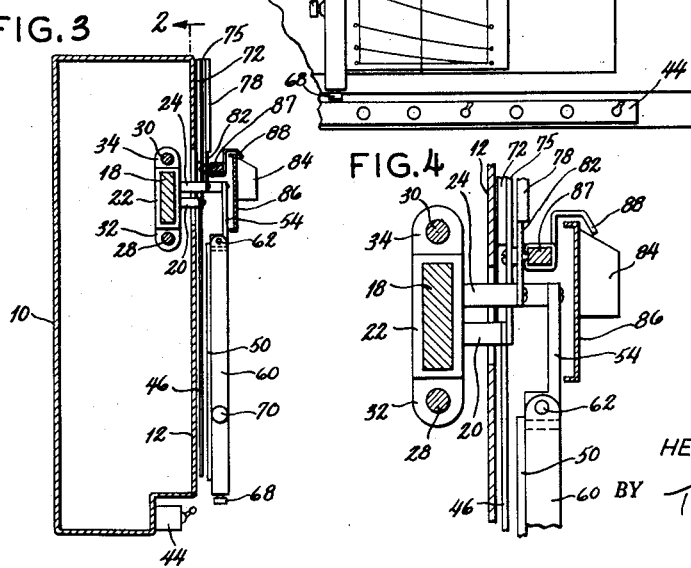

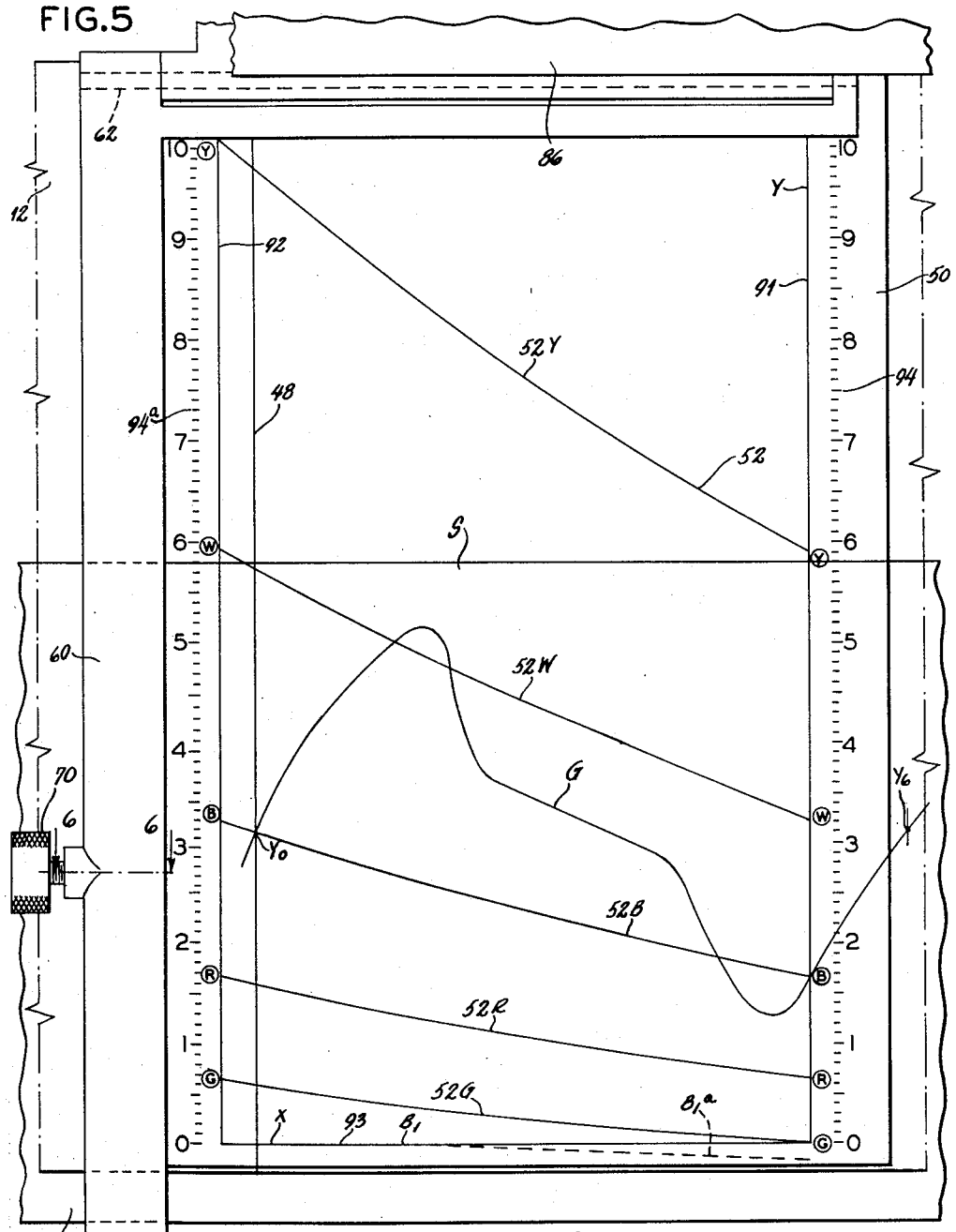

INVENTOR
HEINZ JOSEPH GERBER

BY Teller & McCormick

ATTORNEYS

Dec. 22, 1959 H. J. GERBER 2,918,213
COMPUTING INSTRUMENT FOR USE IN THE ANALYSIS OF GRAPHS
AND CURVES HAVING INITIALLY UNKNOWN CHARACTERISTICS
Filed Sept. 25, 1956 8 Sheets-Sheet 4

FIG. 9

INVENTOR.
HEINZ JOSEPH GERBER

BY Teller & McCormick

ATTORNEYS

Dec. 22, 1959　　　　　H. J. GERBER　　　　　2,918,213
COMPUTING INSTRUMENT FOR USE IN THE ANALYSIS OF GRAPHS
AND CURVES HAVING INITIALLY UNKNOWN CHARACTERISTICS
Filed Sept. 25, 1956　　　　　　　　　　　　　8 Sheets-Sheet 5

INVENTOR.
HEINZ JOSEPH GERBER

BY Teller + McCormick

ATTORNEYS

INVENTOR
HEINZ JOSEPH GERBER

ATTORNEYS

Dec. 22, 1959      H. J. GERBER      2,918,213
COMPUTING INSTRUMENT FOR USE IN THE ANALYSIS OF GRAPHS
AND CURVES HAVING INITIALLY UNKNOWN CHARACTERISTICS
Filed Sept. 25, 1956      8 Sheets—Sheet 7

INVENTOR
HEINZ JOSEPH GERBER

BY

ATTORNEYS

Dec. 22, 1959    H. J. GERBER    2,918,213
COMPUTING INSTRUMENT FOR USE IN THE ANALYSIS OF GRAPHS
AND CURVES HAVING INITIALLY UNKNOWN CHARACTERISTICS
Filed Sept. 25, 1956    8 Sheets-Sheet 8

INVENTOR.
HEINZ JOSEPH GERBER

BY Teller & McCormick

ATTORNEYS

United States Patent Office 2,918,213
Patented Dec. 22, 1959

2,918,213

COMPUTING INSTRUMENT FOR USE IN THE ANALYSIS OF GRAPHS AND CURVES HAVING INITIALLY UNKNOWN CHARACTERISTICS

Heinz Joseph Gerber, Hartford, Conn., assignor to The Gerber Scientific Instrument Company, Hartford, Conn., a corporation of Connecticut Application September 25, 1956, Serial No. 611,860

29 Claims. (Cl. 235—61)

TOPIC

| | Column |
|---|---|
| General Discussion | 1 |
| General Mechanical Organization | 2 |
| Curve Plate or Sheet—Figs. 5, 7 and 8 | 7 |
| Scale Plate or Carrier—Fig. 9 | 11 |
| Coefficient Indicator Plate or Carrier—Fig. 9 | 11 |
| Alternative Scale and Indicator Carriers—Fig. 10 | 14 |
| Alternative Indicator Plate or Carrier With Index Plate—Fig. 11 | 14 |
| Variable Scale Device Including Pointer—Figs. 1 and 9 | 15 |
| Use of Instrument for Division of Graph Cycle into Predeterminate Sections—Figs. 12 to 15 | 15 |
| Program Form or Sheet—Figs. 16 and 17 | 17 |
| Use of Instrument and Program Form or Sheet Thereof for Determining Unknown Coefficients of Equation—Figs. 16 and 17 | 19 |
| Alternatively Useable Program Form or Sheet—Figs. 18 and 19 | 21 |

GENERAL DISCUSSION

The invention relates to a computing instrument particularly constructed and adapted for use in the analysis of graphs and curves having initially unknown mathematical characteristics. In accordance with the invention, the instrument is constructed to provide parts registrable with various points on a graph or curve and said instrument is adapted to indicate various values that are functions of the heights of said various points and to thus determine said initially unknown mathematical characteristics. The general object of the invention is to provide an improved instrument so constructed and adapted. While the instrument is particularly intended for the stated use, the invention is not necessarily so limited.

A specific object of the invention is to provide an instrument of the type specified having various mechanical features which facilitate the positioning of a graph or curve to be analyzed and which facilitate the relative movements of the parts for purposes of analysis and computation.

Another specific object of the invention is to provide an instrument of the type specified which includes a logarithmically plotted curve so arranged that the instrument can be used to indicate functions of the heights of points on a curve or graph when said heights are zero or only slightly greater than zero.

Still another specific object of the invention is to provide an instrument of the type specified which includes a curve having multiple sections for registering with a graph or curve at various points thereon and similarly having multiple logarithmic scale sections corresponding respectively to said curve sections.

Still another specific object of the invention is to provide an instrument of the type specified which includes a conveniently useable means for dividing a cycle of a graph to be analyzed into a plurality of predeterminate sections.

Still another specific object of the invention is to provide an instrument of the type specified including conveniently arranged means for facilitating the recording of values read on the instrument and for facilitating the use of the recorded values.

Other specific objects of the invention will be apparent from the drawings and from the following description.

In the drawings I have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 1 is a partly schematic plan view of a computing instrument embodying the invention.

Fig. 2 is a fragmentary view in some respects similar to Fig. 1 but with certain parts broken away to more clearly show other parts.

Fig. 3 is a transverse section taken along the line 3—3 of Fig. 1.

Fig. 4 is an enlarged fragmentary view of a portion of Fig. 3.

Fig. 5 is an enlarged fragmentary view of the hairline sheet and curve sheet shown in the front portion of Fig. 1.

Fig. 6 is an enlarged fragmentary sectional view taken along the line 6—6 of Fig. 5.

Fig. 9 is an enlarged fragmentary view of the scale sheet and the coefficient sheet and other parts shown in the rear portion of Fig. 1.

GENERAL MECHANICAL ORGANIZATION

Figure 7:
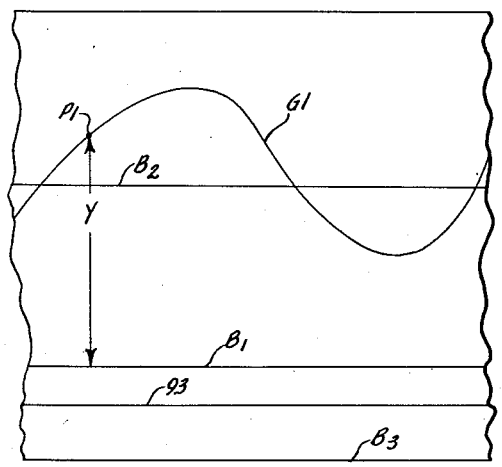
Fig. 7 is a diagrammatic view of a representative graph to be analyzed.

The presently preferred mechanical construction of the computing instrument will be first described with only incidental reference to the mathematical functioning thereof. Thereafter the manner of use and the mathematical functions will be described. The mechanical construction may vary widely as to details and the showing as presented is partly schematic.

The instrument as shown in Fig. 1 comprises a box 10 having a cover 12. The bottom and top of Fig. 1 will be regarded respectively as being at the front and at the rear of the machine. Said cover 12 serves not only as a closure for the box but also as a support for a sheet of paper or other material having thereon a graph to be analyzed. Such a sheet is shown at S in Figs. 1 and 5, the graph on said sheet being designated by G. The sheet S may be secured to the cover 12 by pressure sensitive adhesive tape or otherwise. The cover 12 is preferably formed of transparent or translucent material, and a light, not shown, is located beneath the cover so that the graph is illuminated from below. Said cover 12 is sometimes hereinafter referred to as the "graph support."

As shown in Figs. 2 and 3, there are provided within the box two slides 14 and 16 which are separately movable longitudinally. Preferably the slides are mounted on and guided by a single guide bar 18 which extends longitudinally across the interior of the box and is secured to the end walls thereof. The slide 14 is relatively long and it includes a beam 20 which extends upwardly through a relatively wide longitudinal slot in the cover 12. At the ends of the beam 20 of the slide 14 are spaced parts 22, 22 which engage the bar 18 to guide the slide. The slide 16 is relatively short and it includes a beam 24 which is at the rear of the beam 20 and extends upwardly through the same longitudinal slot in the cover 12. At the ends of the beam 24 of the slide 16 are spaced parts 26, 26 which engage the bar 18 to guide said slide. The parts 26, 26 of the slide 16 are between the parts 22, 22 of the slide 14 and said slide 16 can be moved only within the limits imposed by said parts 22, 22.

Said slides 14 and 16 may be longitudinally moved by direct manual engagement, but slidable means are preferably provided for so moving them. Said means are shown as including two longitudinal screws 28 and 30 which are rotatable but which are fixed against longitudinal movement. The screw 28 has threaded engagement with a lug 32 on the slide 14 and the screw 30 has threaded engagement with a lug 34 on the slide 16. The screws 28 and 30 are operable respectively by electric motors 36 and 38, said screws being connected with said motors by gearing indicated respectively at 40 and 42. The motors 36 and 38 are operable independently of each other and in either direction under the control of manually operable switches included in a control panel 44. The motors may optionally be operable at either of two different speeds.

Figure 14:
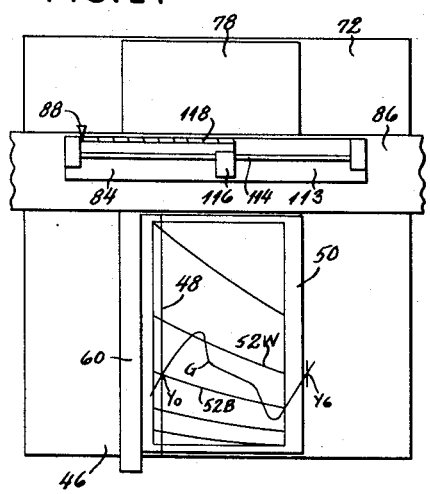
Fig. 14 is a view similar to Fig. 13 and illustrating a third step.

Secured to the beam 20 of the longer slide 14 and extending forwardly therefrom is a sheet 46 which is above and closely adjacent the cover 12 and a graph thereon, which sheet 46 has a transverse hairline 48 thereon. The sheet 46 is movable longitudinally by means of the slide 14 and the hairline 48 on said sheet is registrable or intersectible with any selected point on said graph G on said cover 12. The sheet 46 will sometimes hereinafter be referred to as the "hairline" sheet. Preferably the sheet 46 is transparent and the hairline 48 is located about midway of the longitudinal length of the sheet. Said sheet 46 may be initially in direct contact with the cover or with a paper sheet thereon, but for convenience of illustration it is shown in Figs. 3 and 14 as being spaced therefrom. The length of the sheet 46 is shown as being about the same as the length of beam 20 and the width of said sheet is preferably such that it extends nearly to the front edge of the cover 12. However, the length of the sheet 46 is not important as it is merely necessary for the sheet to be of sufficient size to carry the hairline 48.

Secured to the beam 24 of the shorter slide 16 and extending forwardly therefrom is a plate or sheet 50 preferably formed of a transparent material which may be glass. Said sheet 50 is shown as being above and closely adjacent the sheet 46. The sheet 50 may be normally in substantially direct contact with said sheet 46 but for convenience of illustration said sheet 50 is shown in Figs. 3 and 4 as being spaced from said sheet 46. The details of said sheet 50 and of its mounting are more fully shown in Figs. 5 and 6. The longitudinal dimension of the sheet 50 is preferably about the same as the length of said beam 24. The transverse dimension of said sheet 50 is preferably about the same as that of the sheet 46. The sheet 50 is provided with a curve or a plurality of curve sections indicated generally at 52 and hereinafter fully described in connection with Figs. 5, 7 and 8. The curve sections 52 on said sheet 50 are registrable or intersectible with any selected point on said graph G. The plate or sheet 50 will sometimes hereinafter be referred to as the "curve sheet."

The two sheets 46 and 50 are superposed, and the curve sheet 50 is shown as being above the hairline sheet 46. However, this particular arrangement is not essential and it may be modified. It is essential, however, that the two sheets be so related to each other and to the graph support 12 that the hairline 48 on one sheet and one of the curve sections 52 on the other sheet can be positioned to simultaneously intersect a selected point on the graph. The two slides 14 and 16 respectively constitute means for supporting and guiding said superposed sheets for longitudinal movement relatively to the graph support and relatively to each other. When said sheet 50 is a glass plate it is above the plate 46 and has substantial thickness, said curve sections 52 are preferably on the lower face of said plate so as to be immediately adjacent the hairline 48 on the sheet 46. This reduces errors in reading as will be fully apparent.

As shown, the graph support 12 is stationary, and the hairline sheet 46 and the curve sheet 50 are movable longitudinally each independent of the other. However, it is only essential that provision be made for relative longitudinal movement among said three parts and any reversal of the relationship shown and described is within the scope of the present invention.

Each of said sheets 46 and 50 is preferably movable upwardly relatively to the slide that carries it so as to facilitate the mounting of a graph sheet such as S on said graph support 12. The hairline sheet is preferably very thin and is preferably flexible so that the lower portion thereof can be flexed upwardly to permit the insertion beneath it of said sheet S having thereon a graph such as G. When the sheet 50 is a rigid plate, such as a glass plate, said plate is preferably pivotally connected with its slide so that it can be pivotally moved upwardly.

As shown, said plate 50 is connected with the beam 24 of the slide 16 by means of a forward extension or bracket 54 extending over the top of the beam 20 and also by means of a member 56 having a longitudinal portion 58 and a rigidly connected forwardly extending transverse portion 60. The portion 58 of said member is pivotally connected at its ends with the beam extension 54 for movement about a longitudinal axis at 62 and said plate 50 is connected to and carried by said transverse portion 60 of said member. By reason of the described construction the plate 50 is pivotally movable about the longitudinal axis at 62 and this enables the plate to be swung upwardly so as to permit the described upward flexing of the sheet 46.

The connection between the curve plate or sheet 50 and the member portion 60 is preferably such that said sheet can be adjusted forwardly and rearwardly within certain relatively narrow limits. The details of the adjustable connection can be widely varied, but one suitable construction is shown in Figs. 5 and 6. The portion 60 is tubular except for a slot at the rear, and a bar 64 is fitted within said tubular portion 60 for movement longitudinally of said portion, that is, forwardly or rearwardly with respect to the machine. The bar 64 has a downward extension which projects through the slot in the tubular portion and said sheet 50 is connected with said bar extension. The bar 64 has a central threaded hole into which extends a rotatable screw 66 which is fixed against movement longitudinally of said tubular portion. The screw 66 has a head 68 by means of which said screw can be turned for adjusting the bar 64 and the sheet 50 longitudinally of said tubular member, that is, forwardly or rearwardly with respect to the instrument as a whole. A screw 70 may be provided for clamping the bar 64 and the sheet 50 in adjusted position. The reasons for the last-described adjustability will be made more fully apparent hereinafter.

Secured to one of the supporting and guiding means for the sheets 46 and 50, that is, to said slides 14 and 16 and extending rearwardly from said means or slides is a carrier 72 for one or more longitudinal logarithmic scale sections 74, 74 which will be hereinafter fully explained in connection with Fig. 9. While the invention is not necessarily so limited, the scale carrier 72 is preferably secured to the slide 14 and more particularly to the beam 20 thereof. The said scale carrier may be varied but it is preferably a flat plate.

As shown, the carrier or plate 72 is supported by two arms 75, 76 which are longitudinally spaced and which extend rearwardly from the ends of the beam 20, a space being provided between said plate and said beam 20. The beam 24 of the shorter slide 16 extends through the last said space. The plate 72 is above and closely adjacent the cover 12. The said plate may be very close to the cover but for convenience of illustration it is shown in Figs. 3 and 4 as being substantially spaced therefrom. The length of the plate 72 is preferably about the same as the length of said beam 20 and as shown the end edges of the plate 72 are approximately in vertical alignment with the end edges of the hairline sheet 46. The width of said plate 72 is preferably such that it extends nearly to the rear edge of the cover 12.

It has been stated that a scale carrier 72 is secured to one of the supporting and guiding means for the sheets 46 and 50, that is, to one of the slides 14 and 16. Secured to the other of said means or slides and extending rearwardly therefrom is a carrier 78 for various "coefficient" or indicator markings generally indicated at 80 and hereinafter fully explained in connection with Fig. 9. When the scale carrier 72 is secured to the slide 14 the indicator carrier is secured to the other slide 16 and more particularly to the beam 24 thereof. The indicator markings 80 on said carrier 78 cooperate with the scales 74 on the carrier 72 as hereinafter explained. The said carrier 78 may be varied but it is preferably a flat plate formed of a transparent material which may be glass.

The carrier or plate 78 may be carried by a relatively narrow rearward extension 82 on said beam 24. Said plate 78 is so supported by said extension that it is above and closely adjacent the carrier or plate 72. The plate 78 may be in substantially direct contact with the plate 72, but for convenience of illustration said plate 78 is shown in Figs. 3 and 4 as being spaced from said plate 72. For accuracy the markings 80 are preferably on the rear face of the plate 78 so as to be immediately adjacent said scale sections 74, 74. The longitudinal dimension of the plate 78 is preferably about the same as the length of the beam 24 and about the same as the longitudinal dimension of the curve sheet 50, the transverse edges of the sheet 78 being at least approximately in vertical alignment with the transverse edges of the plate 50.

A means for measuring longitudinal movements is preferably mounted in a fixed longitudinal position on the box 10, and this means preferably includes a device 84 having a scale of variable length. The measuring means or variable scale device 84 may be variously supported but it is shown as being on the front face of a fixed longitudinal bar 86 which is connected at its ends with the end wall of the box and which is so located that it is at the front of the beams 20 and 24 of the slides 14 and 16. Said bar 86 is shown as having an inverted channel shape and it is so located that it covers or conceals the longitudinal slot in the cover 12. The measuring means or device 84 is shown only schematically in Fig. 1 but it is shown in detail in Fig. 9 and it will be hereinafter fully described in connection therewith.

Carried by the beam 20 of the longer slide 14 is a longitudinal bar 87 for holding and guiding a longitudinally adjustable pointer or indicator 88, said pointer or indicator being located to register with the graduations of the variable scale of the measuring means or device 84. As shown, the bar 87 that holds said indicator 88 is connected at its ends with the beam 20, and it is preferably connected with said arms 75, 76 that carry the scale carrier or plate 72. The indicator 88 and its supporting bar 87 are bodily movable longitudinally in unison with the hairline sheet 46 and the scale carrier sheet or plate 72, and in addition the pointer 88 is relatively adjustable along said bar 87 and is held in adjusted position. The provision of the bar 87 for supporting the pointer avoids any possible interference with the movement of the shorter slide 16 relatively to the longer slide 14.

As shown and described, the variable scale device 84 in its entirety is fixed against longitudinal movement and the pointer 88 therefore is longitudinally adjustable. An equivalent of the described arrangement would be for the scale device 84 in its entirety to be longitudinally adjustable and for the pointer 88 to be fixed against longitudinal movement.

The instrument preferably includes a program form 89 suitably mounted on the cover 12 or otherwise so as to be conveniently accessible to the user of the instrument. The instrument may also include an alternatively useable program form 90 which is similarly mounted. Fig. 1 shows said program forms 89 and 90 on said cover 12. The program forms are adapted for use in the recordation of values read on the instrument and in computations based upon the recorded values. Said form 89 is more fully explained in connection with Figs. 15 and 16 and said form 90 is more fully expained in connection with Figs. 17 and 18. As has been stated, the cover 12 is preferably transparent or translucent, and when the program forms 89 and 90 are on said cover they may be illuminated from below.

From the foregoing general description it will be apparent that the instrument as shown includes three groups of major parts as follows:

(a) The graph support or cover 12 and the base of the measuring device 84 which are in fixed relation to each other and are shown as being stationary with certain parts of the measuring device nevertheless adjustable relatively to the base, this group preferably also including said program forms 89 and 90 on said graph support 12;

(b) The hairline sheet 46 and the scale carrier or sheet 72 which are in fixed relationship to each other and are shown as being longitudinally movable relatively to the group a parts, said group b also including the pointer 88 which is normally movable with the other group b parts but is also longitudinally adjustable relatively to them; and (c) The curve sheet 50 and the coefficient indicator carrier or sheet 78 which are in fixed relationship to each other and are longitudinally movable relatively to the group a parts and also relatively to the group b parts.

When the several parts are grouped as described, there can be wide variation as to the manner of relative movement between said groups, it being primarily essential that the groups be relatively movable. As an additional example of variation, the indicator sheet 78 could be included in group b in lieu of the scale sheet 72, and the scale sheet 72 could be included in group c in lieu of the indicator sheet 78. Although there may be numerous variations from the presently preferred arrangement of parts as shown and described, the more detailed description that follows will be based upon said preferred arrangement.

CURVE PLATE OR SHEET—FIGS. 5, 7 AND 8

The curve plate or sheet 50 is more clearly shown in Fig. 5. Said curve sheet 50 is in the same position that is shown in Fig. 1, but the hairline sheet 46 has been moved toward the left.

The curve 52 on the curve sheet 50 might be a single continuous curve, but the logarithmic single curve is broken up into a plurality of transversely spaced curve sections 52 so that the longitudinal dimension of the sheet 50 can be reasonably small. Preferably there are five curve sections designated respectively as $52^G$, $52^R$, $52^B$, $52^W$ and $52^Y$. The several curve sections extend between two transverse left and right terminal lines 91 and 92. One end of each section except the first is in longitudinal register at the line 92 with the opposite end of the next preceding section at the line 91. The curve, although divided into a plurality of sections, remains complete and any ordinate height within the limits of the curve can be registered on one of the sections. Preferably the curve sections ascend from right to left so that the ordinate value can be increased by movement of the scale plate from left to right, such movement ordinarily being more convenient.

The curve 52, considered in its entirety, is a logarithmic curve and it is so plotted or formed that for each point on said curve the distance from the transverse or $y$ axis at the right has a logarithmic relationship to the height of said point from the longitudinal or $x$ axis at the front. Said $y$ axis is coincident with the right line 91 and said $x$ axis is coincident with a base line 93. Said lines 91 and 93 are essentially reference lines and they are sometimes hereinafter referred to as coordinates. For convenience, said lines may be included on the sheet 50 but such inclusion is not essential.

When the curve 52 is divided into sections as preferred, said sections are so formed with respect to coordinates comprising one of said transverse terminal lines and a longitudinal line that the longitudinal distance from said transverse coordinate to any selected point on a selected curve section plus the horizontal length of said curve sections multiplied by the number of curve sections below said selected section bears a logarithmic relationship to the height of said selected point from said longitudinal coordinate.

The curve sections 52 on the sheet 50 are registrable with the hairline 48 on the sheet 46. By movement of the curve sheet 50 or of the hairline sheet 46 the hairline can have any desired relative position between the terminal lines 91 and 92. When the hairline 48 is coincident with the right terminal line 91 or the $y$ axis, the height of the curve intersection is zero and this position will be sometimes hereinafter referred to as being in their "primary" position of said hairline sheet with respect to said curve sheet.

For convenience in use, symbols are provided for designating the five sections of the curve, and said symbols have suitable code markings. The symbols may be spots or circles having different shapes, or different colors, and they will be assumed to have different colors such as gray, red, blue, white and yellow. For purposes of illustration the symbols are respectively marked G, R, B, W and Y.

The sheet 50 is preferably provided at the right with a transverse linear scale 94 having eleven major division marks and ten spaces, said scale extending from 0 to 10. The front end of the front curve section $52^G$ is at 0 on said scale and the rear end of the rear curve section $52^Y$ is at 10 on said scale. Another similar scale $94^a$ may be provided at the left. The scales 94 and $94^a$ are graduated in the unit of measurement for which the instrument is to be used, and for convenience of explanation it will be assumed that said scales are graduated in inches.

Figure 8:
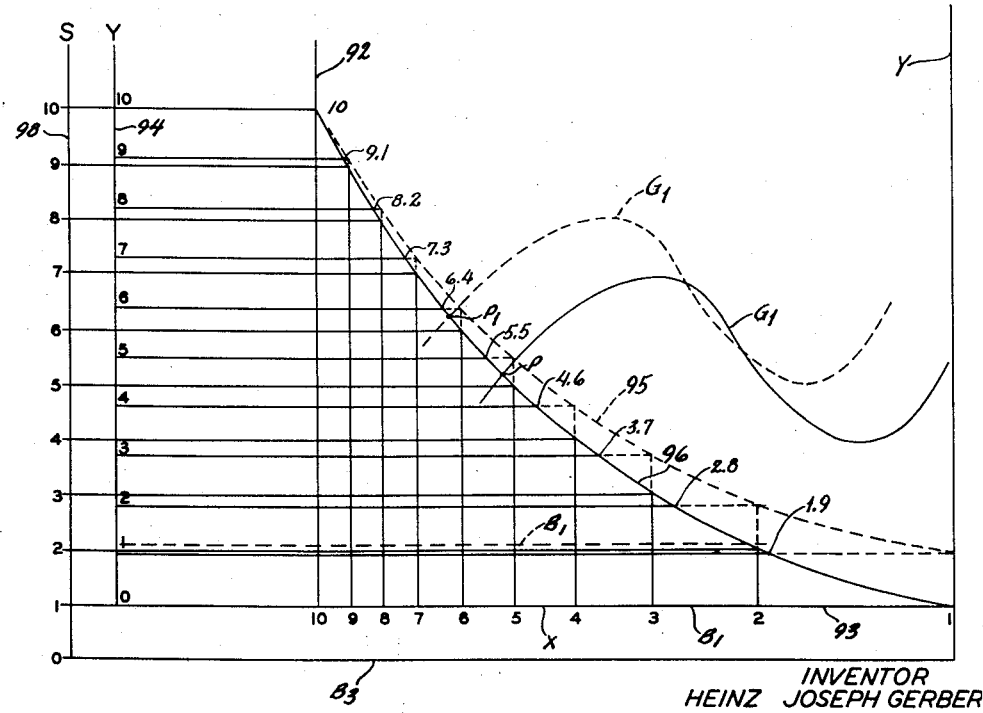
Fig. 8 is a diagrammatic view illustrating the derivation of the curves shown in Fig. 5.

For convenience in explaining the derivation of the curve 52 it will be assumed that said curve is continuous and not divided into several sections. Reference will be made to Figs. 7 and 8, the first of which shows a representative graph $G_1$. The horizontal line $B_1$ represents the reference axis as to which the graph $G_1$ was recorded, the line ordinarily being marked on the graph sheet; the horizontal line $B_2$ represents the actual mean line of the graph; the horizontal line 93 represents the zero line of the instrument curve 52 from which are measured the height $y$ of various points such as P on the graph $G_1$, and the horizontal line $B_3$ represents a theoretical zero line for measuring the height of various points such as P. In the use of the instrument, the graph $G_1$ is preferably so located on the support 12 that the reference axis $B_1$ of the graph is coincidnt with the zero line 93 on the curve sheet 50, but when necessary line $B_1$ may be spaced above said line 93 as hereinafter more fully explained. In any event, the graph must be so located that no portion thereof is below said zero line 93 on the curve plate.

The curve 52 is a true logarithmic curve and it could be plotted horizontally from said transverse coordinate 91 so that for any selected point on said curve the distance between said point and the line or coordinate 91 would be exactly proportionate to the logarithm of the height of said point as read on said scale 94. The schematic Fig. 8 shows such a curve 95 which is so plotted horizontally with respect to the scale 94. A curve such as 95 would have certain limited utility but it could not conveniently be plotted for a height less than 1 on said scale and could not in any event be plotted for a zero height. It is frequently necessary to read heights less than 1 and approaching or at 0, and therefore said curve 52 is preferably differently plotted.

The schematic Fig. 8 also shows a true logarithmic curve 96 having a scale 98 at one side thereof which reads from 0 to 10. This is sometimes hereinafter referred to as the S scale. From 1 to 10 the scale 98 has ten division markings and nine spaces. The vertical dimensions of the curve 96 from 1 to 10 are plotted numerically in accordance with said division markings of the scale 98 and the horizontal dimensions are plotted logarithmically toward the left from a $y$ axis at the right or from the transverse coordinate 91. A horizontal line extends through the marking 1 on the scale 98, and this corresponds to the $x$ axis or the line 93 as shown in Fig. 5. The curve 96 is the same as the curve 52 of the curve sheet 50, except that the latter is broken into five sections for the before-stated reason.

The scale 98 as shown in Fig. 8 does not appear on the curve sheet 50 but the previously described scale 94 is substituted, the last said scale being also shown in Fig. 8 for purposes of comparison. The scale 94 extends only from 1 to 10 with reference to the scale 98, but said scale 94 has eleven division markings and ten spaces. The markings 0 and 10 on the scale 94 align respectively with the markings 1 and 10 on the scale 98. The theoretical zero line $B_3$ as shown in Fig. 7, extends through the marking 0 on the scale 98. This is clearly shown in Fig. 8. The line $B_3$ is entirely theoretical and is never actually used, and it preferably is not included on the curve sheet 50.

Each space on the scale 98 has a definite ratio to each space on the scale 94 which ratio is $$\frac{10}{9}$$

or 1.1111. Each space on the scale 98 therefore represents 1.1111" and the zero line 93 of the scale 94 is 1.1111" above the theoretical zero line $B_3$. If $y$ represents the height in inches from the reference line $B_1$ or 93 of any selected point on the graph as read on scale 94, the height of said point above the line $B_3$ as read on scale 98 or the S scale would be:

(1) $$S = \frac{y + 1.1111}{1.1111}$$

In accordance with the foregoing equation, the corresponding values of y and S are as indicated in Fig. 8. For example, when the actual height $y$ above the base line $B_1$ and above zero line 93 of the instrument, as read on the scale 94, is 2.0 the corresponding value on the S scale 98 represented by the longitudinal logarithmic plotting is 2.8. Similarly 4.0 corresponds to 4.6, and 7.0 corresponds to 7.3.

The value actually desired is that read on scale 94 which value is the height in inches above the reference line $B_1$ or the scale zero line 93, but the value represented by the movement of the curve to cause intersection of a certain point on a graph is the logarithm of the value that could be read on the scale 98 In Fig. 8 the curve 96 and the graph $G_1$ are superposed and a point P is at a position representing the reading 4.6 on the scale 94, thus indicating that said point P is 4.6″ above the combined lines $B_1$ and 93. In accordance with the equation:

$$S = \frac{4.6 + 1.1111}{1.1111} = 5.14$$

From the foregoing it is evident that the distance of relative movement between the curve 96 and the hairline sheet 46 to cause the intersection at P has been equal to the logarithm of 5.14.

The scale 98, or the S scale, in accordance with which the curve 96 was plotted has been described as having ten division markings and nine spaces within the range of 0 to 10 on scale 94. These specific numbers of markings and spaces are ordinarily preferable, but the invention is not necessarily so limited. Other numbers may be used and a logarithmic curve alternative to the curve 96 may be plotted accordingly. When $y$ is the height of any selected point on the curve from the longitudinal coordinate, and when $n$ represents the number of spaces in the suggested alternative S scale between 0 and 10 on scale 94, the height of a point on the suggested alternate curve above the line $B_1$ as read on said alternative S scale would be:

(2) $$S = \frac{y + \frac{10}{n}}{\frac{10}{n}}$$

In accordance with this equation the markings 0 and 10 of the scale 94 would align respectively with the markings 1 and $n$ on the alternative S scale. It will be apparent that Equation 1 is a special example in accordance with the more general Equation 2.

As a further example under Equation 2 it may be assumed that $n$ is eight and for this example it follows that:

$$S = \frac{y + 1.25}{1.25}$$

In the last-mentioned example, the markings 0 and 10 on the scale 94 would align respectively with the markings 1 and 8 on the alternative S scale.

Reverting to the example used as the basis for Equation 1, the logarithmic value that has been determined, such as that of 5.14, may be used in a computation involving a coefficient factor, and in any event correction must be made to convert the S value such as 5.14 back to the true height $y$ above the reference line $B_1$ or above the scale zero line 93. Assuming that there is no coefficient factor other than 1, the correction is made as follows:

(3) $$y = S \times 1.1111 - 1.111$$
$$= 1.1111(S - 1)$$
$$= 1.1111(5.14 - 1)$$
$$= 4.60 \text{ inches}$$

The corrective step is hereinafter more fully discussed.

It will be apparent without detailed explanation that Equation 3 is a special example of the following more general equation:

(4) $$y = S \times \frac{10}{n} - \frac{10}{n}$$
$$= \frac{10}{n}(S - 1)$$

wherein $y$ and $n$ and S are as stated in connection with Equation 2.

It is not always feasible to place the graph such as $G_1$ so that the line $B_1$ coincides with the scale base line 93. It may be necessary to place the graph with the line $B_1$ above the line 93 as indicated by the dotted lines in Fig. 8. It will be assumed that the line $B_1$ is above the line 93 by a distance $d$, which is shown as being 1.25″. In this case if $y$ represents the height in inches above the reference line $B_1$ of any selected point as read on the scale 94, the height $S_1$ of said point above the line $B_3$ as read on the scale 98 would be:

(5) $$S_1 = \frac{(y + d) + 1.1111}{1.1111}$$

In the dotted line position in Fig. 8 the point P is at a position $P_1$ representing the reading 5.85 on the scale 94, thus indicating that said point is 4.6″ above the line $B_1$, or 5.85″ above the line 93. In accordance with the last above equation:

$$S_2 = \frac{(4.6 + 1.25) + 1.1111}{1.1111} = 6.265$$

Therefore the distance of relative movement between the curve 96 and the hairline sheet 46 to cause the last said intersection at $P_1$ has been equal to the logarithm of 6.265.

The logarithmic value such as 6.265 may be used in a computation using a coefficient factor but in any event correction must be made to convert the $S_1$ value such as 6.265 back to the true height $y$ above the reference line $B_1$ which in the example is 4.6″. In the eventual correction:

(6) $$y = 1.1111 \times S_1 - d - 1.1111$$
$$= 1.1111 \times 6.265 - 2.3611$$
$$= 4.6''$$

From the foregoing discussion it will be evident that the curve 96 is a true logarithmic curve with respect to the scale 98, but it is a modified logarithmic curve with respect to the scale 94. Said modified curve deviates from a true logarithmic curve in accordance with a known equation and the readings based upon said curve can be corrected in accordance with a second known equation.

The curve sheet 50 is preferably adjustable transversely as has been described. If there is any minor error in the attaching of the graph sheet to the graph support 12, the line 93 on the scale sheet may not exactly coincide with the line $B_1$ of the graph sheet. This error may be corrected by adjusting the curve sheet by means of the screw 68. Alternatively, the curve sheet may also be adjusted so that the line $B_1$ is spaced above the line 93 by a convenient distance, as for instance 1.25″.

It sometimes happens that the line $B_1$ on the graph sheet is not exactly straight and horizontal. Said line may have a portion $B_1^a$ that varies from the horizontal as shown by a dotted line in Fig. 5. When this condition is encountered, the curve sheet is adjusted, for each reading if necessary, so as to compensate for the deviation in said line $B_1^a$. In positioning the graph sheet S on the graph support 12, care must be taken to make certain that the sheet is mounted in the same relation to the horizontal in which it was recorded. In other words, the graph sheet must not be tilted to bring a line such as $B_1^a$ into a horizontal position.

In the use of the instrument as hereinafter more fully described, the hairline and curve sheets may be longitudinally moved relatively to the graph support and relatively to each other so as to cause said hairline and said curve to effect simultaneous intersection with a selected point on a graph on said graph support 12 with the result that the spacing of said hairline from its said primary position then bears a logarithmic relationship to the height of the graph at said point of intersection, this relationship being derived from the formation of the curve as previously explained. This would be a true logarithmic relationship if a curve such as 95 were provided, but with a curve such as the preferred curve 52 this is a modified logarithmic relationship. Means is provided for reading a value based at least in part upon said logarithmic relationship and therefore based at least in part upon said height of said selected graph point. A preferred form of this means will be fully described.

SCALE PLATE OR CARRIER—FIG. 9

As before stated, the scale plate or carrier 72 is movable in unison with the hairline sheet 46. The scales 74 on said scale carrier or sheet are more clearly shown in Fig. 9. When the curve 52 on the curve sheet 50 is divided into five superposed sections 52G, 52R, 52B, 52W and 52Y as shown and previously described, the scales 74 are similarly divided. The scales considered in their entirety constitute a single logarithmic scale, said scale being broken up into sections so that the longitudinal dimension of the scale plate or carrier 72, like that of the curve sheet 50, can be reasonably small.

Preferably and as shown, the sectional scale is duplicated, there being five scale sections constituting a set at the right of a center line 100 and five similar scale sections constituting a set at the left of said center line. These will sometimes be hereinafter referred to respectively as the first and second sets of scale sections. When the scale carrier is movable with the hairline sheet, said center line 100 is in transverse register with said hairline 48. In any event, said center line is in register with said hairline when the hairline is in its primary position with respect to said curves. The length of each scale section is the same as the longitudinal dimension spanned by each curve section 52 on the curve sheet 50, that is, the distance between said terminal lines 91 and 92. The scale sections at the left of the center line are respectively designated 102, 104, 106, 108 and 110. The rear section 102 starts with the value 10 at its left end and the front section 110 ends with the value 100 at its right end which is on said center line. The first set of scale sections is duplicated at the right of the center line 100 by a second set of scale sections which are designated 102ª, 104ª, 106ª, 108ª and 110ª. Said duplicate scale sections are spaced rearwardly or offset so that sections 104ª, 106ª, 108ª and 110ª respectively join and constitute continuations of sections 102, 104, 106 and 108. The rear section 102ª of the duplicate set of scale sections starts with the value 10 at its left end which is on said center line, and the front section 110ª of the duplicate set of scale sections ends with the value 100 at its right end. The offsetting of the duplicate scales provides scales in six different lines. The provision of duplicate scale sections makes it possible for scale readings to be taken at either side of the center line 100 as required and hereinafter more fully explained.

COEFFICIENT INDICATOR PLATE OR CARRIER—FIG. 9

As before pointed out, the coefficient indicator plate or carrier 78 is transparent and is above the scale plate or carrier 72 so that the scales on said scale plate can be read through said indicator plate. The indicator plate 78 is movable longitudinally in unison with the curve sheet 50, and the last said plate and sheet are movable relatively to the hairline sheet 46 and the scale plate 72, which in turn are movable relatively to the graph support 12. The indicator plate carries a plurality of coefficient indicators 80 that are readable on one or another of the several scales 74 on the scale sheet. Each of the coefficient indicators comprises a line terminating at a corresponding scale section and a connected symbol having two code markings.

The several coefficient indicators on the indicator plate are arranged with their symbols in a plurality of longitudinal rows corresponding generally to the number of scale lines on the scale sheet, and as shown there are six such rows. The indicator symbols are further arranged in a plurality of transverse rows and as shown there are twelve such rows. Each symbol has a first code marking that preferably takes the form of an identifying letter, with all of the symbols in each transverse row having the same letter. Said identifying code markings or letters may be marked directly upon the symbols, but as shown said letters are marked at the rear of the several transverse rows of said symbols. From left to right the identifying letters are L, A, B, C, D, E, F, G, H, I, J and K, but there is no L indicator or symbol at the left end of the rear row. The indicator plate or carrier 78 is preferably, but not necessarily, so located relatively to the curve sheet 50 that the L indicators at the left are in transverse register with the line 92 at the left end of the several curves.

For the particular equation hereinafter set forth to illustrate the manner of use of the instrument, only the coefficient indicators identified by the letters C, F and L are used. The determination of the exact location of the last said indicators will be hereinafter fully explained. The other indicators identified by the letters A, B, D, E, G, H, I, J and K are useful for other equations. When the hairline 48 is in its said primary position with respect to the curve sections 52, that is, in register with the line 91, the L indicators register with the left scales 74 at the left ends thereof. The L indicators have the value of 1.0, and the other indicators have other values as hereinafter explained.

The necessity for the stated duplication of the scales 74, 74 on the scale plate 72, or an equivalent thereof, will be apparent from an examination of Fig. 1. As shown, the curve sheet 50 is positioned with the mid-positions of the curve sections on said hairline 48. Without moving the hairline sheet or the scale plate, the curve sheet with the indicator plate can be moved toward the left until zero is registered on the lower curve, the hairline sheet being then in its relative primary position. The indicator having a value of 1 will then register with the left scale sections 74 at the left end thereof. Without moving the hairline sheet or the scale sheet, the curve sheet with the indicator sheet can be moved toward the right until 10 is registered on the upper curve. The indicator L will then register with the center line 100 which is at the left end of the right scale sections and at the right end of the left scale sections. The sheets may be at any intermediate position between these two extreme positions. It is obvious that similar results are obtained by moving the hairline sheet and the scale plate instead of the curve sheet and the indicator plate. Similar results can also be obtained by relatively moving both sheets and plates to lesser extents. Furthermore, both sheets and plates may be moved in unison to the extent necessary to reach a triple intersection with the graph at a selected point thereon. The hairline sheet 46 and the scale plate 72 are shown in Figs. 5 and 9 as having been moved toward the left from the Fig. 1 position, and the curve sheet and the indicator plate are shown as having been moved toward the right from the Fig. 1 position.

As shown, each indicator is provided with an additional or second code marking which designates the allocation of said indicator to a particular curve section 52, and in computation the operator uses the indicator or indicators corresponding to the intersected curve section. The code markings for the several indicator symbols may take the form of different shapes or different colors which correspond to the shape or color markings of the symbols for the several curve sections as shown in Fig. 5. The code symbols are shown as having different colors which are gray, red, blue, white and yellow. The symbols are respectively marked G, R, B, W and Y. The code color markings enable the user of the instrument to quickly read the required value on the proper one of the several scales 74.

It has been previously stated in Equation 1 that $$S = \frac{y + 1.1111}{1.1111}$$

when S is the reading on the scale 98 and $y$ is the true height of a point on the curve from the base line 93. When the results are to be modified by a coefficient factor such as K, the equation is as follows:

(7) $$KS = \frac{K(y+1.1111)}{1.1111} = \frac{Ky + 1.1111K}{1.1111}$$

From the above it is evident that correction can be made in accordance with the following equation:

(8) $$Ky = 1.1111KS - 1.1111K$$
$$Ky = 1.1111K(S-1)$$

For instance, in Fig. 5 the graph G is shown as intersecting the curve $52^B$ at $y_0$ which is at the height of 3.145″ above the line 93 as read on scale 94. The hairline 48 also intersects $y_0$, and in order to effect the intersection the hairline sheet 46 and the scale sheet 72 have been moved relatively to the curve sheet 50 and the indicator sheet 78. It may be assumed that the equation being dealt with requires the height 3.145″ to be multiplied by 0.5 which is the required value of said coefficient factor K. For purposes of explanation, it is determined by arithmetic that the correct result is 1.5725. It may be further assumed that the indicators C have the value 0.5. Therefore a reading is taken at the indicator C—B, the letter C indicating the value of 0.5 and the letter B indicating that the intersection is on the curve $52^B$. The reading at the indicator C—B is 1915, which reading is the result of the following:

$$0.5S = \frac{0.5(3.145 + 1.1111)}{1.1111} = 1915$$

Making corrections as previously explained:

$$0.5y = 1.1111 \ (1915 - .5)$$
$$= 1.5725$$

It is a limitation of the instrument having the particular dimensions disclosed that the value of $y$ cannot exceed 10″. Obviously a different instrument could have a larger range of values. Each of the coefficients represented by the several indicators 80 is 1 or less and it therefore follows that the composite values read at said indicators are always 10 or less, ordinarily less. For convenience, said values are recorded in four numerals without any decimal point, the recorded values being one thousand times the actual values. A correction is later made as hereinafter explained.

In some instances, when the initial $y$ value is relatively small, the composite value is less than 1 and said value when multiplied by one thousand is less than 1000. To facilitate the recording of such composite values some of the coefficient indicators are provided with a third code marking which takes the form of a "0." For instance, all of the indicators in the lower row except that at the left as shown in Fig. 9 are so marked. When any indicator is marked with "0," the recorded value has "0" as the first numeral, as for instance 0743. This avoids delays and possible errors in recording the composite values.

The various coefficient indicators in the set 80 of such indicators may have various values. It has been stated that the L indicators as shown have a value of 1 and that the C indicators have a value of 0.5. All of said indicators as shown have values corresponding to trigonometric functions, but the invention is not so limited. The values of the indicators as shown are stated below.

*Table A*

$L = \sin 90° = 1.0000$
$A = \sin 15° = .2588$
$B = \sin 45° = .7071$
$C = \sin 30° = .5000$
$D = \sin 52\frac{1}{2}° = .7933$
$E = \sin 7\frac{1}{2}° = .1305$
$F = \sin 60° = .8660$
$G = \sin 67\frac{1}{2}° = .9238$
$H = \sin 22\frac{1}{2}° = .3827$
$I = \sin 37\frac{1}{2}° = .6088$
$J = \sin 75° = .9659$
$K = \sin 82\frac{1}{2}° = .9914$

ALTERNATIVE SCALE AND INDICATOR CARRIERS—FIG. 10

The machine as so far described includes a scale plate or carrier 72 having two sets of scale sections 74, 74 thereon and includes an indicator plate or carrier 78 having only a single set of coefficient indicators 80 thereon. As an alternative, there may be provided a scale plate $72^a$ similar to the scale plate 72 except that it has only one set of scale sections thereon, and an indicator plate $78^a$ similar to the indicator plate 78 except that it has duplicate first and second sets of coefficient indicators thereon, said indicator sets being respectively identified as $80^a$ and $80^b$.

The scale sections 74 on the plate $72^a$ may be exactly like one set of scale sections on the plate 72. As shown, the center of said scale sections is in register with the hairline 48. Each of the two sets of indicators $80^a$ and $80^b$ is substantially like the set of indicators 80, but with only five scales only five rows of indicators are necessary. The two sets of indicators are preferably symmetrically disposed with respect to the scale sheet 50.

Figure 10:
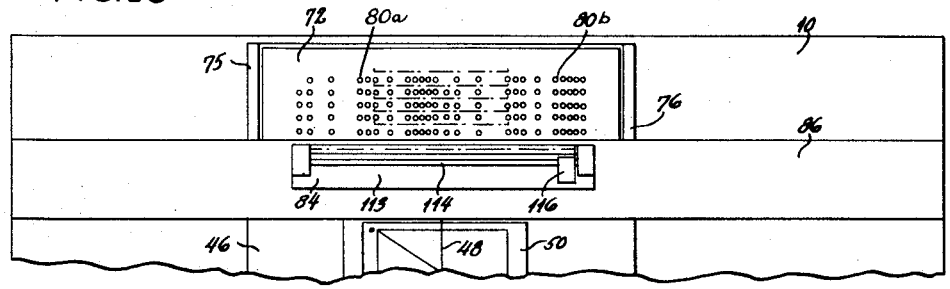
Fig. 10 is a fragmentary view similar to the upper portion of Fig. 1 and showing an alternative embodiment of the invention.

The manner of use of the alternative parts shown in Fig. 10 is very similar to that previously described and no detailed description is necessary.

ALTERNATIVE INDICATOR PLATE OR CARRIER WITH INDEX PLATE—FIG. 11

Figure 11:
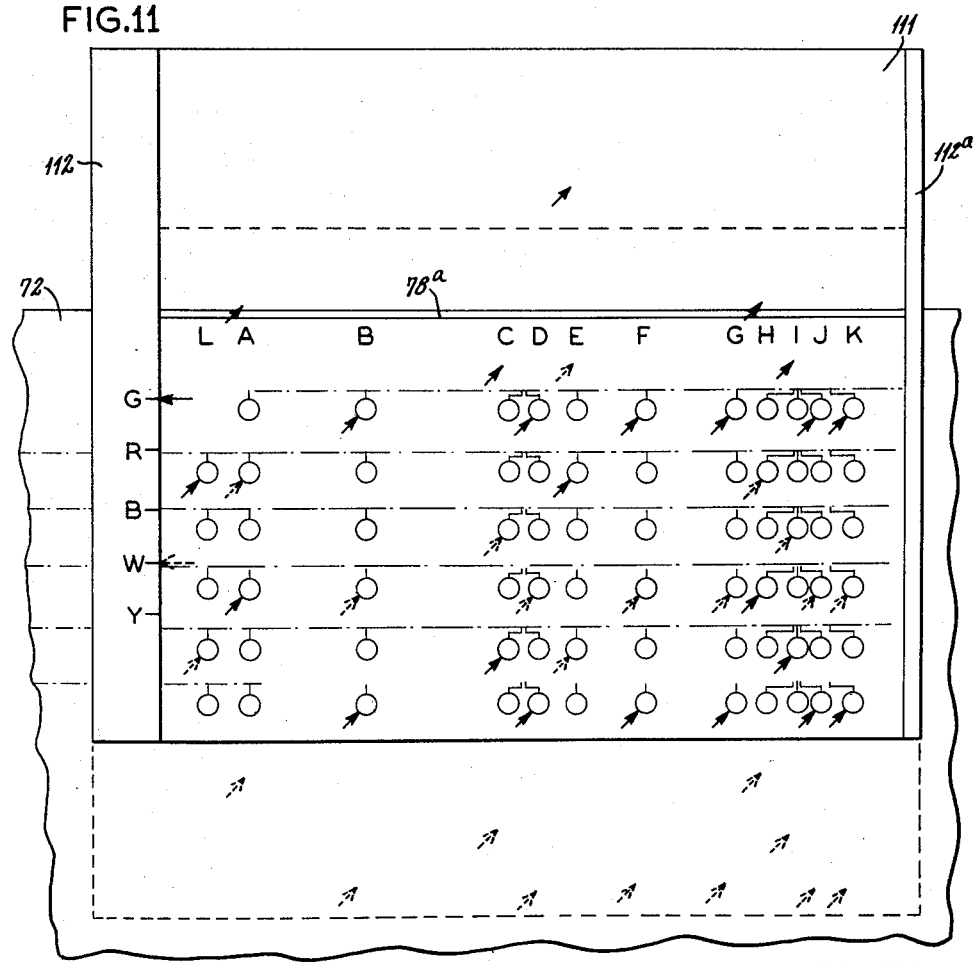
Fig. 11 is a fragmentary view similar to a portion of Fig. 9 and showing an alternative embodiment of the invention.
Figure 12:
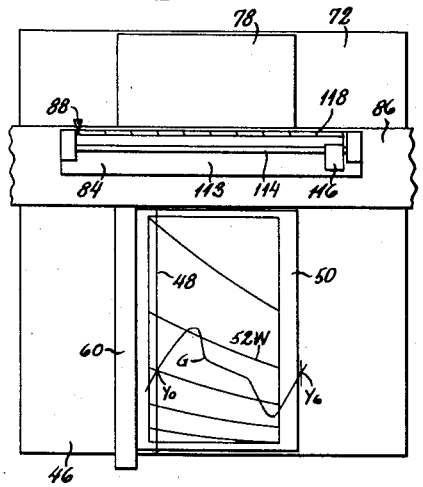
Fig. 12 is a schematic view illustrating one step in the operation of the instrument for dividing a graph cycle into equal sections.

The code markings such as G, R, B, W and Y may be omitted from the indicators 80 with a resultant alternative indicator plate $78^a$ as shown in Fig. 11. In lieu of code markings directly on said indicator plate, code markings are provided on a transparent code plate 111 which is superimposed upon said indicator plate $78^a$ and is guided for transverse adjustment by transverse guides 112, $112^a$ at the sides thereof. Said code markings on the plate 111 are in the form of arrows.

The code plate 111 is shown with its arrows pointing to the coefficient indicators that are marked G in Fig. 9. Marks G, R, B, W and Y are provided on the guide 112 and there is a horizontal locating arrow on the plate 111 which, in the position shown, registers with the mark G. Whenever the graph intersection point is on the scale section $52^G$, the code plate 111 is located as shown and readings are taken at one or more of the indicators 80 that are designated by the code arrows.

If a subsequent graph intersection is on the curve section $52^W$, the code plate 111 is adjusted downwardly to the position shown by dotted lines so that the horizontal arrow registers with the mark W on the guide 112. Then readings are taken at one or more of the indicators 80 that are designated by the code arrows in their new positions, these being the indicators that are marked W in Fig. 9.

In order to permit the illustrated downward adjustment of the code plate 111, the indicator plate and also the scale plate may be spaced rearwardly from the positions shown in Figs. 1 and 9.

VARIABLE SCALE DEVICE INCLUDING POINTER—FIGS. 1 AND 9

As has been stated, a variable scale device 84 is preferably provided and said device is mounted in fixed position on the longitudinal bar 86. This variable scale device may be similar to that shown in my Patent No. 2,530,955 dated November 21, 1950 for Instrument for Measuring, Interpolating and the Like.

The variable scale device comprises a stationary base 113 secured to said bar 86 and having a longitudinal guideway 114. A slide 116 is movable along the guideway 114 and is frictionally held in any position to which it may be moved. A specially shaped coil spring 118 has its left end connected with the base 113 and has its right end connected with the slide 116, said spring constituting the before-mentioned variable scale. The spring 118 and the immediately associated parts may be constructed as shown in detail in my said patent. Said spring 118 has a predetermined number of effective convolutions, ordinarily 100 convolutions, which convolutions are triangular and serve as scale graduations. The left or "0" convolution or graduation is in fixed relation to the stationary base 113 and the right or "100" graduation is substantially in fixed relation to the slide 116. The exact location of the device 84 is not important, and furthermore, within reasonable limits the extended length of the variable scale spring is not important. However, as shown the device 84 is so located that the "0" convolution of the spring is directly in front of the left ends of the scales 74 on the scale plate 72 when said scale plate is in its central position as shown in Fig. 1. Also, when the slide 116 is in its extreme right position, the "100" graduation of the spring is directly in front of the right ends of said scales 74.

When the slide 116 is moved to its extreme left position, the effective length of the spring 118 is preferably one-tenth of its effective extended length. It will be understood that the slide 116 can be moved to any intermediate position, and that for each position of said slide the graduations of the spring 118 are uniformly spaced.

For convenience of identification certain graduations of the spring 118 are specially marked. As shown, each 10th graduation may be red, as indicated by the notation "Red" to indicate the numbers 0, 10, 20, 30, 40, 50, 60, 70, 80, 90 and 100, said numbers appearing in Fig. 9 but ordinarily not being marked on the instrument. Additional color markings for intermediate graduation numbers may be provided if required.

From the foregoing description it will be apparent that said variable scale has a stationary zero graduation and is variable in length and always has its graduations uniformly spaced from said zero graduation notwithstanding said length variation.

The before-described indicator or pointer 88 is bodily movable longitudinally in unison with the hairline sheet 44 and with the scale plate 72 and it is longitudinally adjustable relatively to them along the bar 87. The point of said pointer can be moved into register with any graduation of the spring 118 and it is shown in Fig. 9 as being in register with the "0" graduation.

USE OF INSTRUMENT FOR DIVISION OF GRAPH CYCLE INTO PREDETERMINATE SECTIONS—FIGS. 12 TO 15

For reasons hereinafter stated, a selected portion or cycle of the graph, such as G, must be divided into a selected number of predeterminate sections, said sections ordinarily but not necessarily being equal. To so divide the cycle, the hairline must be moved to a plurality of predeterminately spaced positions. As an example it will be assumed that the cycle must be divided into six equal parts and that the hairline must therefore be moved to at least six uniformly spaced positions. As concerns certain of the broader aspects of the invention, the graph cycle may be so divided by any suitable procedure or apparatus, but preferably and in accordance with more specific aspects of the invention said graph cycle is divided by means of the described variable scale device 84. The division of said graph cycle by the use of said variable scale device will now be described.

Figure 13:
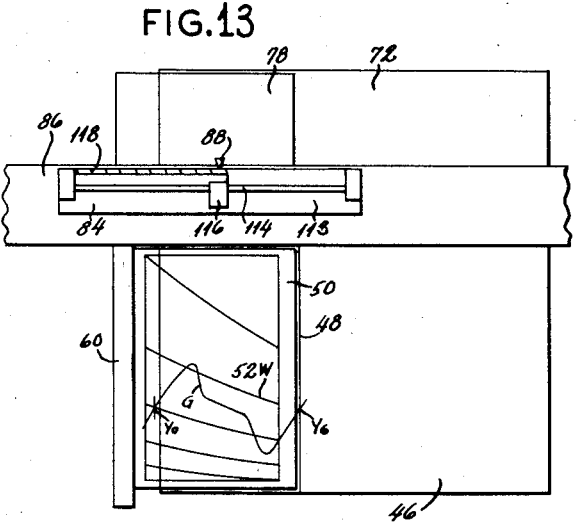
Fig. 13 is a view similar to Fig. 12 and illustrating a second step.
Figure 15:
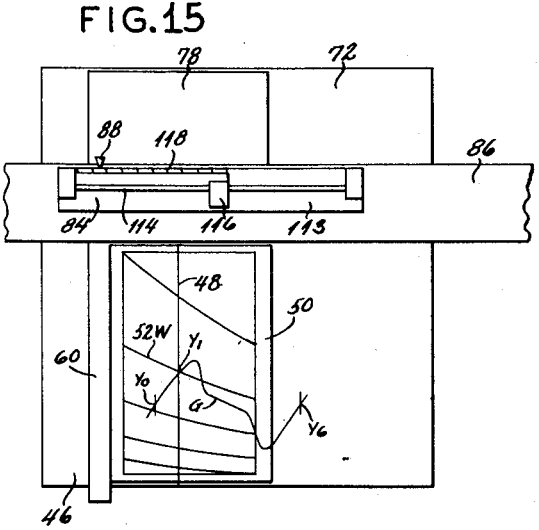
Fig. 15 is a view similar to Fig. 14 and illustrating a fourth step.

As shown in Figs. 5 and 8, selected cycle of the graph G has terminal points $y_0$ and $y_6$. For dividing the distance between $y_0$ and $y_6$ into six equal sections the procedure is as follows, particular reference being made to Figs. 5, 12, 13, 14 and 15:

a. The slide 14 is adjusted to bring the hairline 48 into register with point $y_0$ on the graph G as shown in Figs. 5 and 10. In the example this involves no movement of said hairline sheet 46 from the central position shown in Fig. 1. The pointer 88 is longitudinally adjusted along the bar 87 so that it registers with the "0" graduation of the spring 118, it being remembered that said "0" graduation is stationary and not adjustable and that said pointer 88 is bodily movable in unison with the hairline sheet 46 and with the scale sheet 72. In the example this involves no movement of said pointer 88 from the Fig. 1 position.

b. The slide 14 is moved toward the right so that the hairline 48 registers with the point $y_6$ on the graph, as shown in Fig. 13. The pointer 88 moves to the same extent as said hairline. Without any adjustment of said indicator the slide 116 of the variable scale device is adjusted toward the left so as to bring into register with the pointer 88 a graduation of the spring 118 having a number which is a multiple of 6. 96 is such a number and it is assumed that the graduation having this number will be used, this being shown in Fig. 13. As the result of this procedure the distance between the "0" graduation and the "96" graduation has been made exactly equal to the longitudinal distance between the points $y_0$ and $y_6$.

c. Without further adjustment of the pointer 88 or of the variable scale spring 118, the slide 14 is moved toward the left so that said indicator again registers with the "0" graduation, the hairline being thus returned to the position wherein it intersects the point $y_0$ on the graph G as shown in Fig. 14. This position is identified as "Station 0." The slide 16 is moved toward the right so that one of the curves on the curve sheet 50 also intersects the graph G as shown in said Fig. 14 and also shown in Fig. 5. With the parts in this position, a reading is taken on the scales 74 as already explained in connection with Figs. 5 and 9.

d. After the reading has been taken at Station 0, the slide 14 is moved toward the right so that the pointer 88 registers with graduation "16" of the variable scale spring 118, 16 being one-sixth of 96. This locates the hairline 48 at a position wherein it intersects the point $y_1$ on the graph G as shown in Fig. 15. Said position is identified as "Station 1" and it is one-sixth of the distance from the point $y_0$ to the point $y_6$. The slide 16 is moved toward the right or left as necessary to bring one of the curves 52 into register with said point $y_1$. A second reading is taken on the scales 74. The procedure for Station 1 is repeated for Stations 2, 3, 4 and 5, the slide 14 being moved successively toward the right so that the pointer 88 successively registers with graduations "32," "48," "64" and "80" of the variable scale spring, the hairline being thus successively located at six uniformly spaced stations wherein it intersects the graph G at the points $y_1$, $y_2$, $y_3$, $y_4$ and $y_5$. It will be understood that the said hereinafter described procedure is followed at each of said six stations. No reading is necessary for the point $y_6$ as such reading would be a duplicate for that at the point $y_0$.

PROGRAM FORM OR SHEET—FIGS. 16 AND 17

An instrument embodying the invention is particularly adapted to be used for the analysis of recorded curves or graphs in terms of various mathematical equations such as a power series, or a Fourier series, or orthogonal polynomials or exponential functions. The instrument serves for measuring the height of a recorded graph at a plurality of uniformly spaced points thereon which represent divisions of a cycle of said graph into a predetermined number of equal sections and also serves for determining and recording the values of unknown components of a predetermined equation to which said graph approximately conforms. The before-mentioned graph G will be taken as an example, this being reproduced in Fig. 16.

Equations representing a Fourier series have been selected as illustrative. For representative Fourier series the equations are:

(9) $y = K(a_1 \sin \theta + a_2 \sin 2\theta + b_0 + b_1 \cos \theta + b_2 \cos 2\theta + b_3 \cos 3\theta)$

(10) $y = K(a_1 \sin \theta + a_2 \sin 2\theta + a_3 \sin 3\theta + b_0 + b_1 \cos \theta + b_2 \cos 2\theta + b_3 \cos 3\theta + b_4 \cos 4\theta)$ wherein $y$ is the height of the graph, wherein $\theta$ is the longitudinal distance measured in terms of angle between the initial end of the selected cycle of the graph and any one of a plurality of uniformly spaced points in said cycle with the length of said cycle constituting 360°, wherein $K$ is a constant that may be determined, and wherein $a_1$, $a_2$, $b_0$, $b_1$, $b_2$ and $b_3$ are initially unknown. Two Fourier equations have been given, but the instrument preferably includes provision for handling other Fourier equations up to forty-eight or more terms and for handling other equations of different types.

For each type of analysis involved in the use of the instrument, a "program" form is provided corresponding to the selected equation, such a form having been previously mentioned and being shown schematically at 89 in Fig. 1. A program form 89 is shown in detail in Fig. 17 and this is merely representative of various program forms that might be provided. The program form 89 that is shown has various code-marked spaces thereon for the recording of values to be determined by the use of the instrument, said spaces being arranged in several groups according to the respective requirements for determining the values of said unknown components of said predetermined equation. The spaces are preferably arranged in horizontal rows corresponding in number to the number of terms in the equation and said spaces are further arranged in vertically extending groups corresponding in number to the number of unknown components in the equation.

The code markings for the indicators 80 on the indicator carrier 78 have been described, and the program form is provided with code markings that correspond to the code markings for the indicators. The arrangement of the code marking for the program form spaces is such that all readings taken for one point of graph intersection are recorded in one horizontal row of said spaces and is preferably such that all readings required for computing one unknown equation component are recorded in one vertically extending group of said spaces.

As shown in Fig. 1, the program form 89 is mounted on the cover 12 of the box 10 which cover is or may be transparent or translucent so that the form 89 can be illuminated from below. When the form is so mounted and adapted to be so illuminated, it is transparent or translucent and a sheet of thin paper can be attached over said form for each graph analysis. The sheet may be attached by pressure sensitive adhesive tape or otherwise. The said values determined by the use of the instrument can be recorded on said paper in the spaces indicated by said form. Alternatively the program form could be printed on separate sheets, and in this case one complete sheet would be used for each graph analysis.

Figures 16, 17:
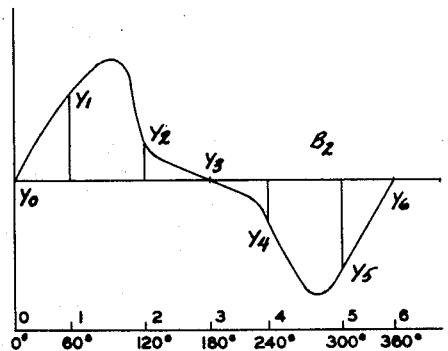
Fig. 16 is a diagrammatic view of one cycle of a graph to be analyzed.
Fig. 17 is a view of a program form that has been selected as representative.

Referring as an example to the graph G as shown in Fig. 16, it will be assumed that one cycle of said graph has been divided into six equal sections by equally spaced transverse lines. The heights of the graph at the intersection points of the last said lines respectively are $y_0$, $y_1$, $y_2$, $y_3$, $y_4$, $y_5$ and $y_6$, it being observed that the heights at $y_0$ and $y_6$ are equal. The angles $\theta$ at the several lines respectively are 0°, 60°, 120°, 180°, 240°, 300° and 360°.

The values of the trigonometric functions necessary for the preparation of the program form 89 are tabulated as follows:

Table B

| Ordinate | $\theta$ | $\sin \theta$ | $\cos \theta$ | $2\theta°$ | $\sin 2\theta$ | $\cos 2\theta$ | $3\theta°$ | $\sin 3\theta$ | $\cos 3\theta$ |
|---|---|---|---|---|---|---|---|---|---|
| $y_0$ | .0° | 0 | +1.0 | 0 | 0 | +1.0 | 0 | -------- | +1.0 |
| $y_1$ | 60° | +.866 | +.500 | 120 | +.866 | -.500 | 180 | -------- | -1.0 |
| $y_2$ | 120° | +.866 | -.500 | 240 | -.866 | -.500 | 720 | -------- | +1.0 |
| $y_3$ | 180° | 0 | -1.0 | 360 | 0 | +1.0 | 540 | -------- | -1.0 |
| $y_4$ | 240° | -.866 | -.500 | 480 | +.866 | -.500 | 720 | -------- | +1.0 |
| $y_5$ | 300° | -.866 | +.500 | 600 | -.866 | -.500 | 900 | -------- | -1.0 |
| $y_6$ | 360° | 0 | +1.0 | 720 | 0 | +1.0 | 1,080 | -------- | +1.0 |

Substituting the values as given in Table B in the general Equation 9 but omitting the constant $K$, the following six simultaneous equations are obtained:

(11) $y_0 = +b_0 + b_1 + b_2 + b_3$

(12) $y_1 = +.866a_1 + .866a_2 + b_0 + .5b_1 + .5b_2 - b_3$

(13) $y_2 = +.866a_1 - .866a_2 + b_0 - .5b_1 - .5b_2 + b_3$

(14) $y_3 = +b_0 - b_1 + b_2 - b_3$

(15) $y_4 = -.866a_1 + .866a_2 + b_0 - .5b_1 - .5b_2 + b_3$

(16) $y_5 = -.866a_1 - .866a_2 + b_0 + .5b_1 - .5b_2 - b_3$

(17) From (11) and (14) by addition $y_0 + y_3 = 2b_0 + 2b_2$

(18) From (11) and (13) by subtraction
$y_0 - y_3 = 2b_1 + 2b_3$

(19) From (12) and (13) by addition
$y_1 + y_2 = 1.732a_1 + 2b_0 - b_2$

(20) From (12) and (13) by subtraction
$y_1 - y_2 = 1.732a_2 + b_1 - 2b_3$

(21) From (12) and (16) by addition
$y_1 + y_5 = 2b_0 + b_1 - b_2 - 2b_3$

(22) From (13) and (15) by addition
$y_2 + y_4 = 2b_0 - b_1 - b_2 + 2b_3$

(23) From (21) and (22) by addition
$y_1 + y_5 + y_2 + y_4 = 4b_0 - 2b_2$

(24) From (23) and (17) $y_1 + y_5 + y_2 + y_4 + y_3 = 6b_0$

(25) $\therefore b_0 = \frac{1}{3}(0.5y_0 + 0.5y_1 + 0.5y_2 + 0.5y_3 + 0.5y_4 + 0.5y_5)$

(26) $\therefore$ From (17) and (25)
$b_2 = \frac{1}{3}(y_0 - 0.5y_1 - 0.5y_2 + y_3 - 0.5y_4 - 0.5y_5)$

(27) $\therefore$ From (21), (22) and (11)
$b_3 = \frac{1}{3}(0.5y_0 - 0.5y_1 + 0.5y_2 - 0.5y_3 + 0.5y_4 - 0.5y_5)$

(28) $\therefore$ From (18) and (27)
$b_1 = \frac{1}{3}(y_0 + 0.5y_1 - 0.5y_2 - y_3 - 0.5y_4 + 0.5y_5)$

(29) $\therefore$ From (19), (25) and (26)
$a_1 = \frac{1}{3}(0.866y_1 + 0.866y_2 - 0.866y_4 - 0.866y_5)$

(30) $\therefore$ From (20), (27) and (28)
$a_2 = \frac{1}{3}(0.866y_1 - 0.866y_2 + 0.866y_4 - 0.866y_5)$ Said program form 89 is compiled from said Equations 25 to 30 and in this compilation certain trigonometric values are used as shown in Table A.

For the above-stated Fourier Equation 9 having six terms the program from 89 has the specific arrangement illustrated in Fig. 17. Based upon the six stations on the graph and based upon the foregoing Equations 25 to 30, the rectangular spaces of the form are arranged in six horizontal rows, designated respectively as Stations 0, 1, 2, 3, 4, 5, and the said spaces are further arranged in eight vertical columns designated respectively as C, C, F, L, C, F, L, C. Some of the spaces are black to indicate that they are not to be used. The remaining spaces are white or gray. In Fig. 17 the black spaces are indicated by horizontal and vertical cross hatching and the gray spaces are indicated by dotted horizontal cross hatching. Some of the spaces have minus signs. Below the first column C are two gray spaces marked respectively "—3000" and "$b_0=$." Below the next three columns "C, F, L" are two longer white and gray spaces marked respectively "$a_1=$" and "$b_1=$." Below the next three columns "C, F, L" are two longer white and gray spaces marked respectively "$a_2=$" and "$b_2=$." Below the last column C are two white and gray spaces, the white space being unmarked but the gray space being marked "$b_3=$." The program form 89 is based upon the following equation which is a specific example of Equation 9:

(31) $Y$ inches$=(3704)(10^{-7})(a_1 \sin\theta + a_2 \sin 2\theta + b_0 + b_1 \cos\theta + b_2 \cos 2\theta + b_3 \cos 3\theta)$ This equation differs from the before-stated more general Equation 9 in that a specific value has been assigned to the constant K. The determination of this specific value will be hereinafter explained.

USE OF INSTRUMENT AND PROGRAM FORM OR SHEET THEREOF FOR DETERMINING UNKNOW COEFFICIENTS OF EQUATION—FIGS. 16 AND 17

After the necessary stations such as 0, 1, 2, 3, 4 and 5 have been established, preferably in the manner previously described the hairline 48 is moved to, or left at Station 0 in intersection with the graph at $y_0$. The slide 16 is moved so that one of the curve sections 52 on the curve plate 50 also passes through the point $y_0$, there being a triple intersection of the graph G and the hairline 48 and the curve section, as shown in Figs. 5 and 14. The curve section that passes through the point $y_0$ is shown as being the third section $52^B$.

In the explanation that follows, it should be kept in mind that the curves 52 are essentially logarithmic with the result that, when a triple intersection has been provided as above described, the distance of the hairline from its described primary position with respect to the curve sheet is approximately proportionate logarithmically to the height of the graph at the intersection, the resulting value being subject to correction as previously explained. The values so subject to correction will be referred to as "S" values. It must be remembered that the curve 52 is in sections and that the distance of the hairline from its primary position includes the lengths of the curve sections in front of the point of intersection. The scale plate 72 moves with the hairline 48 and the indicator plate 78 moves with the curve sheet 50. It therefore follows that the relative movement between the scales and the coefficient sheet has an S value logarithmically proportionate to the height of the graph at the point of intersection. If it were necessary only to measure the height of the graph at the point of intersection, the S value of this height could be read at the registry with the scales 74 of an indicator such as one of the L indicators which represents the coefficient 1.000. However, it is necessary to obtain S values which are also functions of trigonometric and other factors and these can be read on said scales at other indicators such as A, B, C, etc.

Having established the triple intersection at $y_0$, the operator refers to the line of the program form 89 that is marked Station 0. He notes that Station 0 requires S values for C, L, L and C. These values are read on the scales 74 at those of the indicators C and L that are marked for blue, such indicators being used for the reason that the intersection $y_0$ is on the third or "blue" section $52^B$ of the curve 52. The values as so read are noted in the C, L, L, and C spaces of the station line. As stated before, C represents the coefficient 0.500, and L represents the coefficient 1.000. Therefore the value to be entered in each of the C spaces for Station 0 is $0.5S_0$ and the value to be entered in each of the L spaces for Station 0 is $S_0$. These values are read directly on the scales without any separate computation. As before explained, the values are less than 10 but for convenience they are entered as four figure numbers, being one thousand times the actual values.

Having completed the readings and notations for Station 0, the curve sheet and the hairline sheet are moved for a new triple intersection at $y_1$, that is, at Station 1. Station 1 requires values for C, C, F, C, L and C. The $y_1$ intersection is on the fourth or "white" section of the curve, and therefore values are read on the scales 52 at those coefficients C, L and F that are marked for white. C and L have the same values as before and F represents the coefficient 0.866. The values to be entered in each of the C spaces is $0.5S_1$, the value to be entered in each of the F spaces is $0.866S_1$, and the value to be entered in the L space is $S_1$. The white spaces above the white space marked "$a_1=$" constitutes one of the before-mentioned vertically extending group of spaces for recording all readings required for computing one unknown equation component, in this instance $a_1$.

The above-described procedure is repeated for each of Stations 2, 3, 4 and 5, and detailed explanation is unnecessary. Having completed all of the readings and notations, the several coefficients $b_0$, $a_1$, $b_1$, $a_2$, $b_2$ and $b_3$ can be very readily computed.

Referring first to $b_0$, it will be remembered that this is set forth in Equation 25 as follows:

$$b_0 = \tfrac{1}{3}(0.5y_0 + 0.5y_1 + 0.5y_2 + 0.5y_3 + 0.5y_4 + 0.5y_5)$$

The readings at the six stations have given the S values of the six components within the brackets each including the coefficient C, these values being entered under C in the gray spaces in the first column. A gray space marked "$b_0=$" is provided for entering the value of $b_0$ which is the sum of the above-mentioned six C components, less 3000.

It will be observed from correction Equation 8 that, wherein K is the coefficient factor, each S value read on the instrument must be corrected by subtracting 1 from said value and multiplying the result by 1.1111. Referring particularly to $b_0$ and the above Equation 25, we have the equation:

(32)
$$b_0 = 1.1111 \times \tfrac{1}{3} (\text{sum of } C \text{ values} \times 10^{-3} - N \times C \times 10^{-3})$$

wherein the S values of the C components are those read on the instrument which values are multiplied by 1000 and are entered in the first column of the program sheet, wherein N is 1000 times the number of terms in the Fourier equation or 1000 times the number of S values of the C components, in this instance 6000, and wherein C is the value of the C factor, in this instance 0.5 or ½.

(33)
$$\therefore b_0 = 1.1111 \times 1/3 \times 10^{-3} \left( \text{sum of } C \text{ components} - \frac{6000}{2} \right)$$

(34)
$$b_0 = 1.1111 \times \frac{10,000}{3} \times 10^{-7} (\text{sum of } C \text{ components} - 3000)$$

(35)
$$b_0 = \frac{11,111}{3} \times 10^{-7} (\text{sum of } C \text{ components} - 3000)$$

(36) $b_0 = 3704 \times 10^{-7} (\text{sum of } C \text{ components} - 3000)$

21

Equation 29 sets forth the S value of $a_1$ as follows:

$$a_1 = \tfrac{1}{3}(0.866y_1 + 0.866y_2 - 0.866y_4 - 0.866y_5)$$

The readings at Stations 1, 2, 4 and 5 have given the S values of the four components within the brackets, each including the F coefficient, two of these components being positive and two of them being negative, and all of them being entered under F in the white spaces in the third column. A white space marked "$a_1=$" has been provided for entering the value of $a_1$. Adding and subtracting the above-mentioned four components give the total S value within the brackets.

Referring further to said Equation 29 and to the correction Equation 8, we have the equation:

(37) $\quad a_1 = 1.111 \times \tfrac{1}{3} \times 10^{-3}$ (sum of two F components $+2F-$ sum of two F components$-2F$)

wherein F is 0.866.

(38) $\quad \therefore a_1 = 1.1111 \times \tfrac{1}{3} \times 10^{-3}$ (sum of two F components$-$sum of two F components)

(39) $\quad a_1 = 3704 \times 10^{-7}$ (sum of two F components $-$sum of two F components)

In view of the fact that "$+2F$" and "$-2F$" cancel each other, there is no amount to add or subtract, such as $-3000$ for $b_0$ as previously explained.

Equation 28 sets forth the S value of $b_1$ as follows:

$$b_1 = \tfrac{1}{3}(y_0 + 0.5y_1 - 0.5y_2 - y_3 - 0.5y_4 + 0.5y_5)$$

The readings at all six stations have given the S values of the six components within the brackets, four of these components including the C coefficient, two positive and two negative, and two of these components including the L or unity coefficient, one positive and one negative, and all of them being entered respectively under C and L in the gray spaces. A gray space marked "$b_1=$" has been provided for entering the value of $b_1$. Adding and subtracting the above-mentioned six components gives the total S value within the brackets. In view of the full explanations in connection with $b_0$ and $a_1$, further explanation as to $b_1$ is believed to be unnecessary.

Similar procedure is followed for the values of $a_2$, $b_2$ and $b_3$ set forth respectively in Equations 30, 26 and 27. Detailed explanation is unnecessary.

ALTERNATIVELY USEABLE PROGRAM FORM OR SHEET—FIGS. 18 AND 19

The program form 89 shown in Fig. 17 is adapted for use for a Fourier series equation, particularly a six term equation. For further illustration of the invention an alternatively useable program form 90 is also shown, this being adapted for use for a power series equation.

A representative, but simple, power series equation is as follows:

(40) $\quad y = a + bx + cx^2 + dx^3$ which may be represented by the curve 122 shown in Fig. 16 and having a transverse coordinate 124 and a longitudinal coordinate 126. In said equation, $x$ is the distance of a point on said curve 122 from the ordinate 124 and $y$ is the height of said point from the ordinate 126. Four uniformly spaced intersection points are assumed, these being $y_0$, $y_1$, $y_2$ and $y_3$. It will be further assumed that the $x$ values for said points are: $x_0=0$, $x_1=1$, $x_2=2$ and $x_3=3$.

When the $x$ values are as assumed, the following equations are derived from the general Equation 40:

(41) $\quad y_0 = a$
(42) $\quad y_1 = a + b + c + d$
(43) $\quad y_2 = a + 2b + 4c + 8d$
(44) $\quad y_3 = a + 3b + 9c + 27d$ Solving the above equations simultaneously for the coefficients $a$, $b$, $c$ and $d$ in terms of $y_0$, $y_1$, $y_2$ and $y_3$, the following equations are obtained:

22

(45) $\quad a = y_0$

(46) $\quad b = -\tfrac{11}{6}y_0 + 3y_1 - \tfrac{3}{2}y_2 + \tfrac{1}{3}y_3$ $\qquad = -1.833y_0 + 3y_1 - 0.666y_2 + .333y_3$

(47) $\quad c = y_0 - \tfrac{5}{2}y_1 + 2y_2 - \tfrac{1}{2}y_3$ $\qquad = y - 2.5y_1 + 2y_2 - 0.5y_3$

(48) $\quad d = \tfrac{1}{6}y_0 + \tfrac{1}{2}y_1 - \tfrac{1}{2}y_2 + \tfrac{1}{6}y_3$ $\qquad = 0.1666y_0 + 0.5y_2 - 0.5y_2 + 1.666y_3$ It will be observed from the foregoing Equations 45 through 48 that if the ordinate values of $y_0$, $y_1$, $y_2$ and $y_3$ are determined by use of the instrument, the several coefficients of said Equation 40 may be found by multiplying the ordinate values so read by the stated sub-coefficients and then adding the results.

The foregoing equations require that each measured $y$ value be multiplied by one or another of the following, decimal points being ignored:

1833, 3000, 6666, 3333, 2500, 2000, 5000 and 1666

By referring to Table A it will be seen that, with the exception of 5000, none of the required multipliers are represented by coefficient indicators 80 on the indicator plate 78. It would be theoretically possible, but not always practicable, to provide additional indicators on said indicator plate. Alternatively, it would be theoretically possible, but not always practicable, to provide an entirely different substitute indicator plate having indicators with the values required for the last above equations. In lieu of either of the stated expedients, a special program form 90 is provided that makes it possible to use the indicators 80 that are already on said indicator plate 78.

Merely for purposes of explanation, assume that $y_0$ is 1. The first component of Equation 48 would have the value 1666, and by referring to Table A it will be seen that the nearest approach to 1666 is the indicator E having the value 1305, leaving 361 to be added. The nearest approach to 361 is $\tfrac{1}{10}$ of the H value of 3827 or 383, this being too large and requiring 22 to be subtracted. The nearest approach to 22 is $\tfrac{1}{100}$ of the A value of 2588 or 26, giving a result that is too small and requires the addition of 4. The nearest approach to 4 is $\tfrac{1}{1000}$ of the H value of 3827 or 4. These values may be set down as follows:

$$E = 1305$$

$$\tfrac{1}{10}H = \phantom{00}383$$

$$-\tfrac{1}{100}A = \phantom{000}26$$

$$\tfrac{1}{1000}H = \phantom{0000}4$$

Total $= 1666$

By using four indicators, values to four places can be obtained which are ordinarily sufficiently accurate. Frequently, the required result can be obtained with less than four indicators.

The actual value of $y_0$ or of any other $y$ reading is not ordinarily 1, but the values in the example are multiplied by whatever the actual height may be, without otherwise affecting the result.

The principle, as explained in the foregoing example, is utilized in deriving the program form 89 which is arranged for Equation 40. In analyzing a curve such as 122, a selected portion thereof is divided into predeterminate sections, preferably by using the variable scale device 84 in the manner already described. As shown, the curve portion between $y_0$ and $y_3$ is divided into three equal sections. The coil 99 is adjusted to the pointer 88, and thereafter the pointer 88 is set successively at the coils 0, 33, 66 and 99 to locate the four equally spaced stations. At each of the stations readings are taken at the indicators noted on the program form 90.

Referring more particularly to said program form, it will be seen that there are four horizontal rows of spaces corresponding to the four stations 0, 1, 2 and 3, and that there are four vertically extending groups or rows of spaces corresponding to the four initially unknown coefficients a, b, c and d. Within each space are squares for the entry of from one to four readings to be taken at the designated indicators. When there are four squares for any reading the entire reading is entered; when there are three squares the first three digits of the reading are entered; when there are two squares the first two digits are entered; and when there is only one square only the first digit is entered. Some of the entered values are minus as indicated.

It has been previously explained that some of the indicators 80 on the indicator plate 78 are code marked with "0." When the reading required by the program form 90 is to be taken at an indicator so coded, a "0" is entered in the first square allocated for the reading.

When all of the readings have been taken and entered, a summation is taken of all entries respectively under a, b, c and d, due regard being given to those that are minus. These summations are the required values of a, b, c and d.

Figures 18, 19:
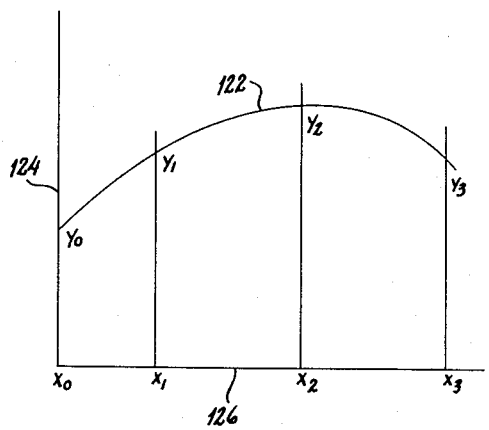
Fig. 18 is a diagrammatic view of a curve to be analyzed.
Fig. 19 is a view of a program form useable alternately to that shown in Fig. 17.

In order to further illustrate this phase of the invention, values have been entered in the squares provided on the program form 90 as shown in Fig. 19. These values are merely exemplary, and they are not intended to represent values corresponding to those for the curve 122 as shown in Fig. 18 nor for any other particular curve.

From the foregoing description it will be seen that some of the spaces on the program form 90 are provided with two or more horizontal rows of squares and are provided with code markings for said rows, said rows of squares being so arranged that the left end of each row other than the top row is offset by one square toward the right with respect to the row next above it so that each number entered in any row other than the top row has a value for vertical addition that is $1/10$ of what said value would be if entered in the row next above.

The values obtained by the use of a program form such as 90 are subject to correction as previously explained. The following equation takes care of the said correction, and it will be seen that this equation is based upon an initial power series equation more general than the foregoing Equation 40 which was chosen as an illustration:

(49) $y = (K)(1.111(a + bpx' + cp^2x'^2 + dp^3x'^3 + ep^4x'^4 + \ldots) - s)$

In the foregoing Equation 49

$x$ = variable along abscissa.
$y$ = variable along ordinate.
$a, b, c, d$ and $e$ are coefficients of the power series equation—obtained from program form 90.
$n$ = highest power of the series used.
$p$ = constant = $n/(x_L - x_0)$.
$x' = x - x_0$.
$x_0$ = numerical starting value of $x$.
$x_L$ = numerical limit value of $x$.
$s$ = distance in inches from line 93 of curve sheet to abscissa.
$K$ = ordinate scale factor.

The invention claimed is:

1. A computing instrument comprising in combination, a support for a sheet provided with a graph extending in a generally longitudinal direction, two superposed sheets relatively movable longitudinally and located above the position of a graph on said support and each so formed that said graph is visible from above, one said sheet having a curve thereon intersectible with such a graph on said support which curve is so formed with respect to transverse and longitudinal coordinates that the longitudinal distance from the transverse coordinate to any selected point on said curve bears a logarithmic relationship to the height of said selected point from the longitudinal coordinate and the other said sheet having a transverse hairline thereon also intersectible with a graph on said support and having a primary position with respect to said curve sheet wherein said hairline coincides with said transverse coordinate, two means adapted respectively for supporting and guiding said superposed sheets for longitudinal movement relatively to the graph support and relatively to each other so as to enable said hairline and said curve to effect simultaneous intersection with a graph on said support at a selected point thereon with the result that the spacing of said hairline from its said primary position then bears the aforesaid logarithmic relationship to the height of the graph at said point of intersection, and means for reading a value based at least in part upon said logarithmic relationship and therefore based at least in part upon said height of said selected point of intersection.

2. A computing instrument as set forth in claim 1, wherein means is included for transversely adjusting said curve sheet relatively to said graph support.

3. A computing instrument as set forth in claim 1, wherein means is included for transversely adjusting said curve sheet relatively to the supporting and guiding means therefor and therefore relatively to said graph support.

4. A computing instrument comprising in combination, a support for a sheet provided with a graph extending in a generally longitudinal direction, two superposed sheets relatively movable longitudinally and located above the position of a graph on said support and each so formed that said graph is visible from above, one said sheet having a curve thereon intersectible with such a graph on said support which curve is so formed with respect to transverse and longitudinal coordinates that the longitudinal distance from the transverse coordinate to any selected point on said curve bears a logarithmic relationship to the height of said selected point from the longitudinal coordinate and the other said sheet having a transverse hairline thereon also intersectible with a graph on said support and having a primary position with respect to said curve sheet wherein said hairline coincides with said transverse coordinate, two means adapted respectively for supporting and guiding said superposed sheets for longitudinal movement relatively to the graph support and relatively to each other so as to enable said hairline and said curve to effect simultaneous intersection with a graph on said support at a selected point thereon with the result that the spacing of said hairline from its said primary position then bears the aforesaid logarithmic relationship to the height of the graph at said point of intersection, a scale carrier positioned and connected for longitudinal movement in unison with one of said superposed sheets and provided with a longitudinal logarithmic scale, and an indicator carrier positioned and connected for longitudinal movement in unison with the other of said superposed sheets and having a coefficient indicator thereon adjacent said logarithmic scale on said scale carrier and adapted for the reading on said scale of a value which is derived from a combined logarithmic relationship resulting in part from the height of said graph intersection point and resulting in part from the position of said indicator on said indicator carrier.

5. A computing instrument as set forth in claim 4, wherein means is included for transversely adjusting said curve sheet relatively to the supporting and guiding means therefor and therefore relatively to said graph support.

6. A computing instrument as set forth in claim 4, wherein the scale carrier is connected to and is movable with said hairline sheet, and wherein said indicator carrier is connected to and is movable with said curve sheet.

7. A computing instrument comprising in combination, a support for a sheet provided with a graph extending in a generally longitudinal direction, a longitudinal guideway in fixed position adjacent the graph support, two slides engaging said guideway and movable therealong, two superposed sheets connected respectively with said slides for longitudinal movement therewith which sheets are located above the position of a graph on said support and are each so formed that said graph is visible from above, one said sheet having a curve thereon also intersectible with such a graph which curve is so formed with respect to transverse and longitudinal coordinates that the longitudinal distance from the transverse coordinate to any selected point on said curve bears a logarithmic relationship to the height of said selected point from the longitudinal coordinate and the other said sheet having a transverse hairline thereon intersectible with a graph on said support and having primary position with respect to said curve sheet when said hairline coincides with said transverse coordinate, manually controlled means for longitudinally moving said slides and said sheets so as to enable said hairline and said curve to effect simultaneous intersection with a graph on said support at a selected point thereon with the result that the spacing of said hairline from its said primary position then bears the aforesaid logarithmic relationship to the height of the graph at said point of intersection, and means for reading a value based at least in part upon said logarithmic relationship and therefore based at least in part upon said height of said selected point of intersection.

8. A computing instrument as set forth in claim 7, wherein means is included for transversely adjusting said curve sheet relatively to the slide which carries it and relatively to said graph support.

9. A computing instrument as set forth in claim 7, wherein each of said sheets is movable upwardly relatively to the slide that carries it so as to facilitate the mounting of a graph sheet on said graph support.

10. A computing instrument as set forth in claim 7, wherein said hairline sheet is flexible and can be flexed upwardly relatively to the slide that carries it and wherein said curve sheet is rigid and is so connected with the slide that carries it that it can be pivotally moved upwardly.

11. A computing instrument comprising in combination, a support for a sheet provided with a graph extending in a generally longitudinal direction, two superposed sheets relatively movable longitudinally and located above the position of a graph on said support and each so formed that said graph is visible from above, one said sheet having a curve thereon also intersectible with such a graph which curve is so formed with respect to transverse and longitudinal coordinates that the longitudinal distance from the transverse coordinate to any selected point on said curve bears a logarithmic relationship to the height of said selected point from the longitudinal coordinate and the other said sheet having a transverse hairline thereon intersectible with a graph on said support and having primary position with respect to said curve sheet when said hairline coincides with said transverse coordinate, two slides located adjacent said graph support and guided for longitudinal movements independently of each other each of which slides at one side thereof carries one of said superposed sheets, manually controlled means for longitudinally moving said slides and said sheets so as to enable said hairline and said curve to effect simultaneous intersection with a graph on said support at a selected point thereon with the result that the spacing of said hairline from its said primary position then bears the aforesaid logarithmic relationship to the height of the graph at said point of intersection, a scale carrier connected with one slide at the opposite side thereof for longitudinal movement in unison with said slide and with one of said superposed sheets and provided with a longitudinal logarithmic scale, and an indicator carrier connected with the other slide at the opposite side thereof for longitudinal movement in unison with said slide and with the other of said superposed sheets and having a coefficient indicator thereon adjacent said logarithmic scale on said scale carrier and adapted for the reading on said scale of a value which is derived from a combined logarithmic relationship resulting in part from the height of said graph intersection point and resulting in part from the position of said indicator on said indicator carrier.

12. A computing instrument comprising in combination, a support for a sheet provided with a graph extending in a generally longitudinal direction, two superposed sheets relatively movable longitudinally and located above the position of a graph on said support and each so formed that said graph is visible from above, one said sheet having a curve thereon intersectible with a graph on said support which curve is so formed with respect to said coordinates that the longitudinal distance from the transverse coordinate to any selected point on said curve is a modified logarithmic function of the height of said selected point from the longitudinal coordinate which modified function deviates in accordance with a known equation from a true logarithmic function and the other said sheet having a transverse hairline thereon also intersectible with a graph on said support and having primary position with respect to said curve sheet wherein said hairline coincides with said transverse coordinate, two means adapted respectively for supporting and guiding said superposed sheets for longitudinal movement relatively to the graph support and relatively to each other so as to enable said hairline and said curve to effect simultaneous intersection with a graph on said support at a selected point thereon with the result that the spacing of said hairline from its said primary position is then the aforesaid modified logarithmic function of the height of the graph at said point of intersection, and means for reading a value based at least in part upon said modified logarithmic function and therefore based at least in part upon the height of said selected point of intersection which value is subject to correction in accordance with a second known equation in order to compensate for the deviation of said modified logarithmic function from a true logarithmic function.

13. A computing instrument as set forth in claim 12, wherein said curve extends through the intersection of said transverse and longitudinal coordinates and therefore has a zero point so that the height of a selected point on said curve may be as small as zero.

14. A computing instrument as set forth in claim 13, wherein said curve is a true logarithmic curve plotted horizontally from said transverse coordinate in accordance with the spacings of a transverse linear scale having the value 1 thereof in horizontal register with the said longitudinal zero coordinate which plotting scale conforms to the equation:

$$S = \frac{y + \frac{10}{n}}{\frac{10}{n}}$$

wherein $y$ is the true height of any selected point on said curve from said longitudinal coordinate, wherein $n$ is the number of spaces in said plotting scale between a $y$ value of zero and a $y$ value of 10, and wherein $S$ is the height of said selected curve point as it might be read on said plotting scale.

15. A computing instrument as set forth in claim 14, wherein the value of $n$ is 9 with the result that said plotting scale conforms to the equation:

$$S=\frac{y+1.1111}{1.1111}$$

16. A computing instrument comprising in combination, a support for a sheet provided with a graph extending in a generally longitudinal direction and having a longitudinal reference line thereon, two superposed sheets relatively movable longitudinally and located above the position of a graph on said support and each so formed that said graph is visible from above, one said sheet having a curve thereon intersectible with such a graph on said support which curve extends through the intersection of transverse and longitudinal coordinates the latter of which is registrable with said reference line on the graph sheet and which curve is so formed that the longitudinal distance from said transverse coordinate to any selected point on said curve is a true logarithmic function of the height of said selected point from a longitudinal reference line spaced at a predetermined distance below said longitudinal coordinate and the other said sheet having a transverse hairline thereon also intersectible with a graph on said support and having a primary position with respect to said curve sheet wherein said hairline coincides with said transverse coordinate, two means adapted respectively for supporting and guiding said superposed sheets for longitudinal movement relatively to the graph support and relatively to each other so as to enable said hairline and said curve to effect simultaneous intersection with a graph on said support at a selected point thereon with the result that the spacing of said hairline from its said primary position then corresponds to the aforesaid logarithmic function of the height of the graph from said longitudinal reference line, and means for reading a value based at least in part upon said logarithmic function and therefore based at least in part upon said height of said selected point of intersection which value is subject to correction in accordance with a known equation so as to determine a true value based upon the height of said selected point from said longitudinal coordinate.

17. A computing instrument comprising in combination, a support for a sheet provided with a graph extending in a generally longitudinal direction, two superposed sheets located above the position of a graph on said support and each so formed that the graph is visible from above, one said sheet having a plurality of transversely spaced curve sections thereon each having a length extending between transverse terminal lines and each so positioned and related that the upper end of each curve section other than the upper one is in longitudinal register with the lower end of the next adjacent curve section with the result that one or another of said curve sections is intersectible with a graph on said support which curve sections are so formed with respect to coordinates comprising one of said transverse terminal lines and a longitudinal line that the longitudinal distance from said transverse coordinate to any selected point on a selected curve section plus the horizontal length of said curve sections multiplied by the number of curve sections below said selected section bears a logarithmic relationship to the height of said selected point from said longitudinal coordinate, and the other said sheet having a transverse hairline thereon also intersectible with a graph on said support and having a primary position with respect to said curve sheet wherein said hairline coincides with said transverse coordinate, two means adapted respectively for supporting and guiding said two superposed sheets for longitudinal movement relatively to the graph support and relatively to each other so as to enable said hairline and one of said curve sections to effect simultaneous intersection with a graph on said support at a selected point thereon, a scale carrier positioned and connected for longitudinal movement in unison with one of said superposed sheets and provided with a plurality or set of transversely spaced longitudinal logarithmic scale sections, the plurality of said scale sections being at least as large as the plurality of said curve sections and the length of said scale sections being at least as great as the horizontal length of said curve sections, and an indicator carrier positioned and connected for longitudinal movement in unison with the other of said superposed sheets and having a plurality of transversely spaced coefficient indicators thereon respectively adjacent said logarithmic scale sections on said scale carrier and each adapted for the reading of a value on the corresponding scale section, the said value being read by means of a selected indicator on the scale section which corresponds to the curve section that intersects the selected point on the graph and said value being derived from a combined logarithmic relationship resulting in part from the height of said graph intersection point and resulting in part from the position of said selected indicator on said indicator carrier.

18. An instrument as set forth in claim 17, wherein the lower section of said curve extends through the intersection of said transverse and longitudinal coordinates and therefore has a zero point so that the height of a selected point on said curve section may be as small as zero, wherein a true logarithmic curve plotted horizontally in accordance with the spacings of a transverse linear scale having the value 1 thereof in horizontal register with the said longitudinal zero coordinate which plotting scale conforms to the equation:

$$S=\frac{y+\frac{10}{n}}{\frac{10}{n}}$$

wherein $y$ is the true height of any selected point on said curve section from said horizontal coordinate, where $n$ is the number of spaces in said plotting scale between a $y$ value of zero and a $y$ value of 10, and wherein $S$ is the height of said selected curve point as it might be read on said plotting scale.

19. An instrument as set forth in claim 17, wherein the scale carrier is provided with duplicate first and second sets of logarithmic scale sections each of which scale sections has the same length as the horizontal length of the curve sections, the scale sections of said sets being immediately adjacent each other.

20. An instrument as set forth in claim 19, wherein the scales of said two sets are transversely offset so that all but the front scale of the first set longitudinally registers with scales of the second set and so that all but the rear scale of the second set registers with scales of the first set, and wherein each two registering scales of each set have continuing values.

21. An instrument as set forth in claim 17, wherein the indicator carrier is provided with duplicate first and second sets of indicators, the indicators of each set being adapted for reading values on said scales.

22. A computing instrument as set forth in claim 17, wherein first and second code markings are provided for each indicator, said first code marking designating a longitudinal spacing corresponding to a particular logarithmic value and said second code marking designating an allocation of the indicator to the intersected curve section.

23. A computing instrument as set forth in claim 22, wherein additional code markings are provided for certain of said indicators to show that the resultant value as read on the corresponding scale section is less than 1 so that said value may be more conveniently recorded.

24. A computing instrument as set forth in claim 22, wherein said second code markings are located in permanent fixed positions on said indicator sheet.

25. A computing instrument as set forth in claim 22, wherein a transparent code plate is provided above said indicator plate and is guided for transverse adjustment to as many different positions as there are curve sections on the curve plate, said code plate being provided code markings which for each said position designate the indicators allocated to the intersected curve section.

26. A computing instrument comprising in combination, a support for a sheet provided with a graph extending in a generally longitudinal direction, two superposed sheets relatively movable longitudinally and located above the position of a graph on said support and each so formed that said graph is visible from above, one said sheet having a curve thereon intersectible with a graph on said support and so formed with respect to transverse and longitudinal coordinates that the longitudinal distance from the transverse coordinate to any selected point on said curve bears a logarithmic relationship to the height of said selected point from the longitudinal coordinate and the other said sheet having a transverse hairline thereon also intersectible with a graph on said support and having a primary position with respect to said curve sheet wherein said hairline coincides with said transverse coordinate, two means adapted respectively for supporting and guiding said superposed sheets and for moving them longitudinally relatively to the graph support and relatively to each other, said means for moving said hairline sheet being constructed and arranged to enable said sheet to be moved successively to a plurality of predetermined spaced positions whereat the hairline intersects said graph at a corresponding plurality of predeterminately spaced points and said means for moving said curve sheet being constructed and arranged to enable said curve to be moved successively to positions for intersecting said graph at said predeterminately spaced points simultaneously with the intersection thereof by said hairline, a normally stationary longitudinal scale, a pointer movable in unison with said hairline sheet and readable on said normally stationary scale for facilitating the location of said hairline successively at said predeterminately spaced positions, and means for successively reading a plurality of values respectively based at least in part upon the several logarithmic values corresponding to the several movements of said hairline sheet relatively to said curve sheet and from its said primary position to effect said several simultaneous intersections and therefore respectively based at least in part upon the several heights of said several graph intersections above said longitudinal reference position.

27. A computing instrument as set forth in claim 26, wherein said scale has a stationary zero graduation and is variable in length and always has its graduations uniformly spaced from said zero position notwithstanding length variation.

28. A computing instrument for measuring the height of a graph at a plurality of uniformly spaced points thereon which represent divisions of a cycle of said graph into a predetermined number of equal sections, said instrument comprising in combination, a support for a sheet provided with a graph extending in a generally longitudinal direction, two superposed sheets relatively movable longitudinally and located above the position of a graph on said support and each so formed that said graph is visible from above, one said sheet having a curve thereon intersectible with a graph on said support and so formed with respect to transverse and longitudinal coordinates that the longitudinal distance from the transverse coordinate to any selected point on said curve bears a logarithmic relationship to the height of said selected point from the longitudinal coordinate and the other said sheet having a transverse hairline thereon also intersectible with a graph on said support and having a primary position with respect to said curve sheet wherein said hairline coincides with said transverse coordinate, a longitudinally extending scale which has a stationary zero graduation and is variable in length and always has its graduations uniformly spaced from said zero graduation notwithstanding length variation, means for varying the length of said scale so that a portion thereof between said zero graduation and another graduation has a length equal to the length of said graph cycle which last said graduation has a number that is a multiple of said predetermined number of graph cycle divisions, a pointer movable in unison with said hairline sheet and registerable successively with scale graduations that are spaced in accordance with the lengths of said graph cycle sections so as to enable said hairline to successively intersect said graph at said uniformly spaced points, means for moving said curve sheet to enable said curve to successively move to positions for intersecting said graph at said uniformly spaced points simultaneously with the intersection thereof by said hairline with the result that the spacing of said hairline from its said primary position at each said point then bears the aforesaid logarithmic relationship to the height of the graph at said point, and means for successively reading a plurality of values respectively based at least in part upon the several logarithmic values corresponding to the several movements of said hairline sheet relatively to said curve sheet and from its said primary position to effect said several simultaneous intersections and therefore respectively based at least in part upon the several heights of said several graph intersections above said longitudinal reference position.

29. A computing instrument as set forth in claim 28, wherein said pointer is longitudinally adjustable relatively to said hairline sheet so that it can be set to the zero graduation of said scale when said hairline is at the initial graph intersection point.

References Cited in the file of this patent

UNITED STATES PATENTS

| | | |
|---|---|---|
| 1,040,592 | Thomas | Oct. 8, 1912 |
| 1,678,674 | Koenig | July 31, 1928 |
| 2,416,772 | Reece | Mar. 4, 1947 |
| 2,513,491 | Killough | July 4, 1950 |
| 2,533,649 | Warner | Dec. 12, 1950 |
| 2,686,633 | Hale | Aug. 17, 1954 |

FOREIGN PATENTS

| | | |
|---|---|---|
| 1,065,300 | France | Jan. 6, 1954 |